US008174731B2

(12) United States Patent
Hasegawa et al.

(10) Patent No.: US 8,174,731 B2
(45) Date of Patent: May 8, 2012

(54) IMAGE PROCESSING DEVICE OUTPUTTING IMAGE FOR SELECTING SAMPLE IMAGE FOR IMAGE CORRECTION

(75) Inventors: Tomohiko Hasegawa, Nagoya (JP); Masaki Kondo, Toyoake (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 680 days.

(21) Appl. No.: 12/202,872

(22) Filed: Sep. 2, 2008

(65) Prior Publication Data

US 2009/0059256 A1    Mar. 5, 2009

(30) Foreign Application Priority Data

Aug. 31, 2007  (JP) .................................. 2007-226088
Aug. 31, 2007  (JP) .................................. 2007-226584
Aug. 31, 2007  (JP) .................................. 2007-226586

(51) Int. Cl.
  *H04N 1/40*  (2006.01)
(52) U.S. Cl. ........................ 358/3.24; 358/406; 358/504
(58) Field of Classification Search .................. 358/1.9, 358/2.1, 468, 3.24, 3.26, 527, 400, 500, 406, 358/504
See application file for complete search history.

(56) References Cited

U.S. PATENT DOCUMENTS

| | | | |
|---|---|---|---|
| 5,210,600 A | 5/1993 | Hirata | |
| 5,459,589 A | 10/1995 | Ohnishi et al. | |
| 5,539,426 A * | 7/1996 | Nishikawa et al. | 345/635 |
| 5,680,230 A | 10/1997 | Kaburagi et al. | |
| 5,734,802 A | 3/1998 | Maltz et al. | |
| 5,764,380 A | 6/1998 | Noguchi | |
| 5,805,308 A | 9/1998 | Tanaka et al. | |
| 5,940,530 A | 8/1999 | Fukushima et al. | |
| 6,072,914 A | 6/2000 | Mikuni | |
| 6,333,752 B1 * | 12/2001 | Hasegawa et al. | 715/764 |
| 6,646,760 B1 | 11/2003 | Hanihara | |

(Continued)

FOREIGN PATENT DOCUMENTS

EP        1 648 158 A1    4/2006
(Continued)

OTHER PUBLICATIONS

Web-page from Hiroshima Prefecture Website, together with English translation, Mar. 31, 2005, http://www.work2.pref.hiroshima.jp/soho/a/a08/a08061.html.

(Continued)

*Primary Examiner* — Thomas D Lee
*Assistant Examiner* — Stephen M Brinich
(74) *Attorney, Agent, or Firm* — Scully, Scott, Murphy & Presser, PC

(57) ABSTRACT

An image processing device includes an original image inputting unit, an original-image characteristic quantity data determining unit, an outputting unit, a selecting unit, and a correcting unit. The original image inputting unit is configured so as to be capable of inputting an original image. The original-image characteristic quantity data determining unit determines original-image characteristic quantity data expressing a characteristic of the original image inputted by the original image inputting unit. The outputting unit outputs at least one set of image data or indication concerning at least one set among a plurality of sets of sample-image characteristic quantity data. The selecting unit enables a user to select one set of image data among the at least one set of image data. The correcting unit corrects the original image based on one set of sample-image characteristic quantity data corresponding to the selected set of image data and the original-image characteristic quantity data.

33 Claims, 22 Drawing Sheets

U.S. PATENT DOCUMENTS

| | | |
|---|---|---|
| 6,757,427 B1 | 6/2004 | Hongu |
| 6,801,334 B1 | 10/2004 | Enomoto |
| 6,922,261 B2 | 7/2005 | Asano |
| 7,145,597 B1 | 12/2006 | Kinjo |
| 7,215,792 B2 | 5/2007 | Sharma et al. |
| 7,283,247 B2 | 10/2007 | Okawa et al. |
| 7,308,155 B2 | 12/2007 | Terada |
| 7,349,119 B2 | 3/2008 | Tsukioka |
| 7,508,550 B2 | 3/2009 | Kameyama |
| 7,729,013 B2 | 6/2010 | Nishida |
| 7,903,307 B2 | 3/2011 | Dai et al. |
| 2002/0060796 A1 | 5/2002 | Kanno et al. |
| 2003/0031375 A1 | 2/2003 | Enomoto |
| 2003/0091229 A1 | 5/2003 | Edge et al. |
| 2003/0128379 A1 | 7/2003 | Inoue |
| 2003/0193582 A1 | 10/2003 | Kinjo |
| 2004/0212808 A1 | 10/2004 | Okawa et al. |
| 2005/0152613 A1 | 7/2005 | Okutsu |
| 2005/0220347 A1 | 10/2005 | Enomoto et al. |
| 2006/0001928 A1 | 1/2006 | Hayaishi |
| 2006/0140477 A1 | 6/2006 | Kurumisawa et al. |
| 2006/0187477 A1 | 8/2006 | Maki et al. |
| 2006/0238827 A1 | 10/2006 | Ikeda |
| 2006/0256410 A1 | 11/2006 | Koie et al. |
| 2006/0257041 A1 | 11/2006 | Kameyama et al. |
| 2006/0291017 A1 | 12/2006 | Moran et al. |
| 2007/0019260 A1 | 1/2007 | Tokie |
| 2007/0070436 A1 | 3/2007 | Iwaki |
| 2007/0080973 A1 | 4/2007 | Stauder et al. |
| 2007/0177029 A1 | 8/2007 | Wada et al. |
| 2007/0206206 A1 | 9/2007 | Kondo et al. |
| 2007/0292038 A1 | 12/2007 | Takemoto |
| 2008/0002216 A1 | 1/2008 | Matsushima |
| 2008/0239410 A1 | 10/2008 | Hashii et al. |
| 2009/0128871 A1 | 5/2009 | Patton et al. |
| 2009/0244564 A1 | 10/2009 | Kondo et al. |
| 2010/0033745 A1 | 2/2010 | Dai et al. |

FOREIGN PATENT DOCUMENTS

| | | |
|---|---|---|
| JP | H05-119752 | 5/1993 |
| JP | H05-300531 | 11/1993 |
| JP | 5-342344 A | 12/1993 |
| JP | 6-133329 | 5/1994 |
| JP | 7-177366 A | 7/1995 |
| JP | 7-312720 A | 11/1995 |
| JP | H09-116740 | 5/1997 |
| JP | H09-172553 | 6/1997 |
| JP | H09-284583 | 10/1997 |
| JP | 9-325536 | 12/1997 |
| JP | 10-173947 | 6/1998 |
| JP | H10-149441 | 6/1998 |
| JP | H11-098374 | 4/1999 |
| JP | H11-185034 | 7/1999 |
| JP | H11-196258 | 7/1999 |
| JP | 2000-106623 | 4/2000 |
| JP | 2000-152268 | 5/2000 |
| JP | 2000-196904 A | 7/2000 |
| JP | 2001-051062 | 2/2001 |
| JP | 2001-061062 | 3/2001 |
| JP | 2001-160908 | 6/2001 |
| JP | 2002-171408 | 6/2002 |
| JP | 2003-108987 | 4/2003 |
| JP | 2003-187215 | 7/2003 |
| JP | 2003-296723 | 10/2003 |
| JP | 2004-007370 | 1/2004 |
| JP | 2004-054751 | 2/2004 |
| JP | 2004-343365 | 12/2004 |
| JP | 2004-350212 | 12/2004 |
| JP | 2005-182143 A | 7/2005 |
| JP | 2005-192158 | 7/2005 |
| JP | 2005-197996 | 7/2005 |
| JP | 2005-202469 | 7/2005 |
| JP | 2005-242535 | 9/2005 |
| JP | 2005-309651 | 11/2005 |
| JP | 2006-80746 | 3/2006 |
| JP | 2006-121695 | 5/2006 |
| JP | 2006-229537 | 8/2006 |
| JP | 2006-229811 A | 8/2006 |
| JP | 2006-303899 | 11/2006 |
| JP | 2007-89179 | 4/2007 |
| JP | 2007-208413 | 8/2007 |
| WO | WO 2006/036027 A1 | 4/2006 |

OTHER PUBLICATIONS

Japanese Official Action dated Aug. 25, 2009 with English translation.

Japanese Official Action dated Sep. 8, 2009 with English translation.

Web-page from the SITEMAKER website, together with English translation, May 11, 2007, http://www.nl-sitemaker.com/cgi-bin/nextone/sitemaker.cgi?mode=page=page2&category=4.

Web-page from a personal website, namely 'kappa teki denou kukkan', together with English translation, Apr. 12, 2001, http://kapp.cool.ne.jp/howto/cg/comic6.htm.

Manual for Epson Colorio PM-D770, together with English translation, Oct. 7, 2004.

Manual for Canoscan 8400F, together with English translation, Jul. 18, 2004.

Japanese Official Action dated Jun. 7, 2011 together with an English language translation from JP 2007-226584.

Japanese Official Action dated Jun. 7, 2011 together with an English language translation from JP 2007-226586.

Japanese Office Action issued in Patent Application No. JP 2007-226090 on Apr. 12, 2011 together with English language translation from related U.S. Appl. No. 12/202,986.

Official Action dated May 31, 2011 received from the Japanese Patent Office from related Japanese Application No. JP 2007-226091 and U.S. Appl. No. 12/194,680, together with a partial English-language translation.

United States Office Action dated Jul. 25, 2011 received in related U.S. Appl. No. 12/194,680.

U.S. Official Action dated Apr. 14, 2011 from related U.S. Appl. No. 12/202,971.

U.S. Official Action dated Apr. 19, 2011 from related U.S. Appl. No. 12/200,472.

U.S. Official Action dated May 18, 2011 from related U.S. Appl. No. 12/202,986.

U.S. Official Action dated Oct. 20, 2011 from related U.S. Appl. No. 12/202,885.

Office Action dated Aug. 9, 2011 received from the Japanese Patent Office from related Japanese Application No. 2007-226088, together with an English-language translation.

United States Office Action dated Oct. 25, 2011 received in related U.S. Appl. No. 12/202,986.

U.S. Final Official Action dated Sep. 29, 2011 from related U.S. Appl. No. 12/200,472.

Final Office Action dated Mar. 15, 2012 received in a related U.S. Appl. No. 12/202,986.

\* cited by examiner

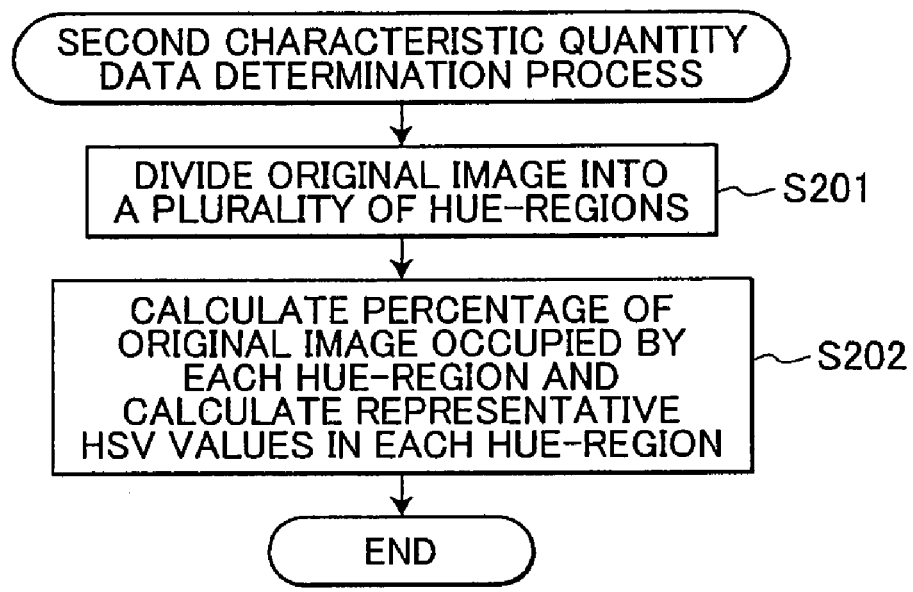
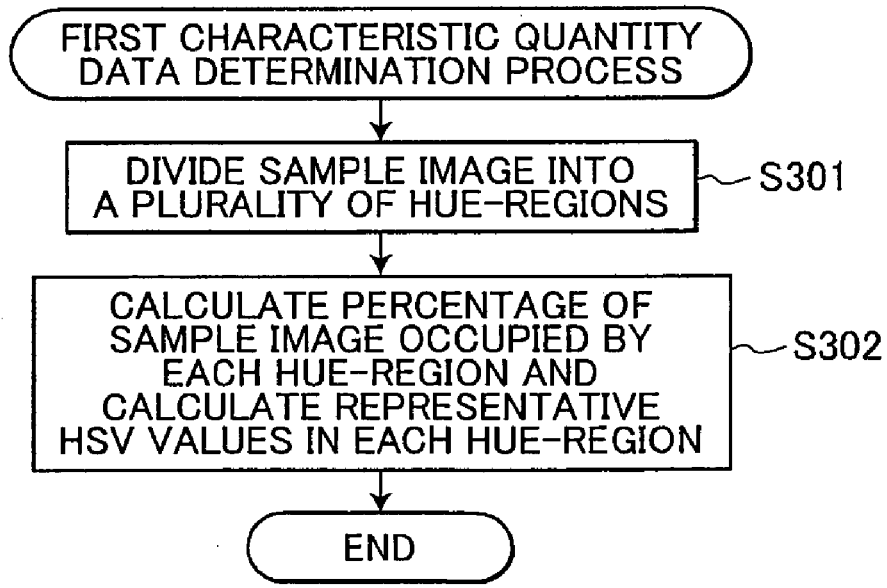

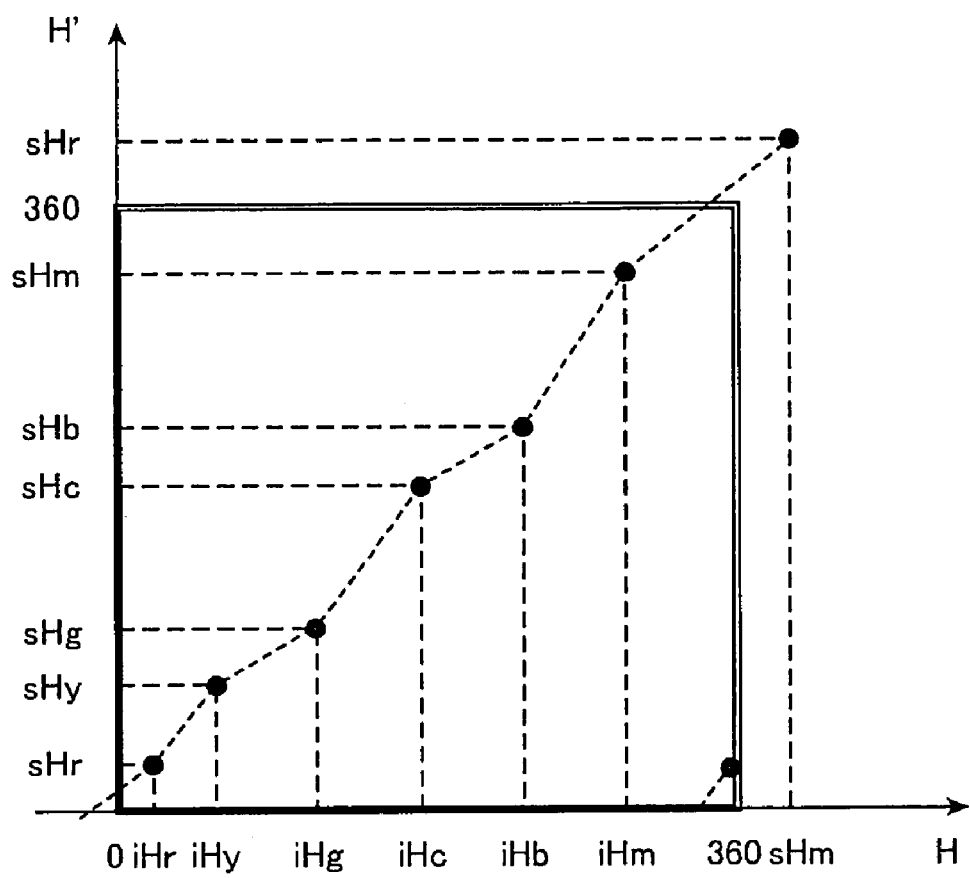

FIG.16
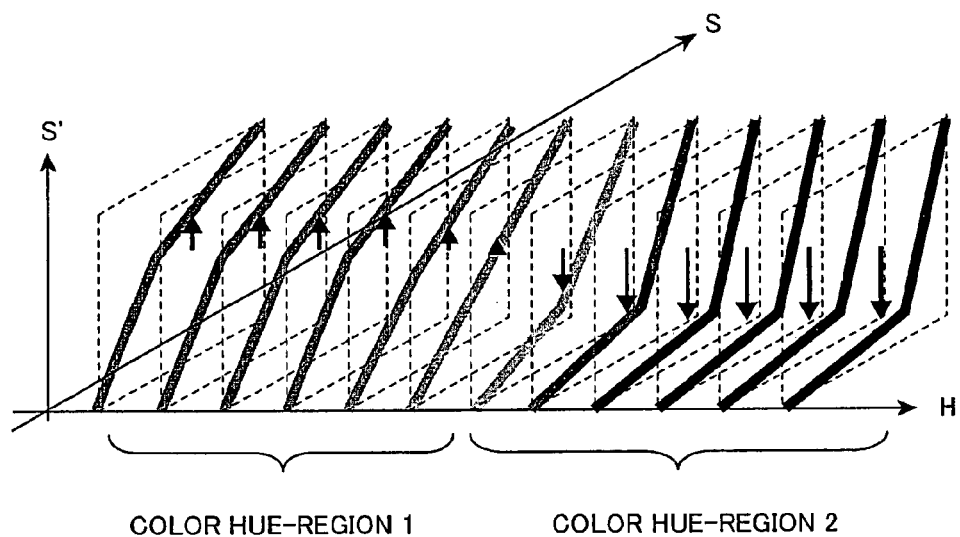
COLOR HUE-REGION 1    COLOR HUE-REGION 2
FIG.17
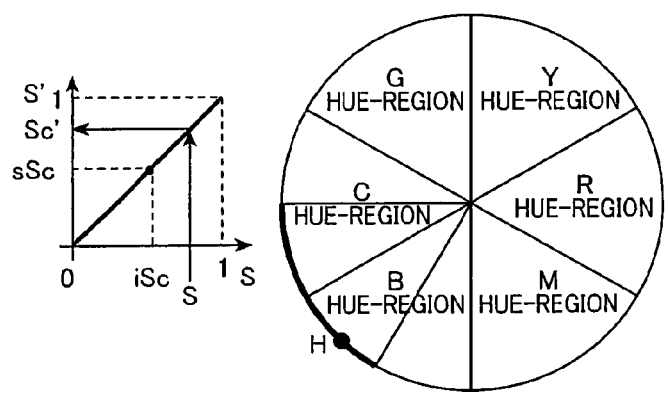
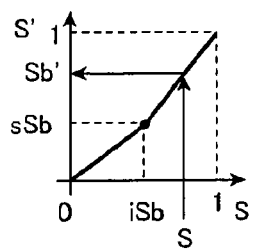

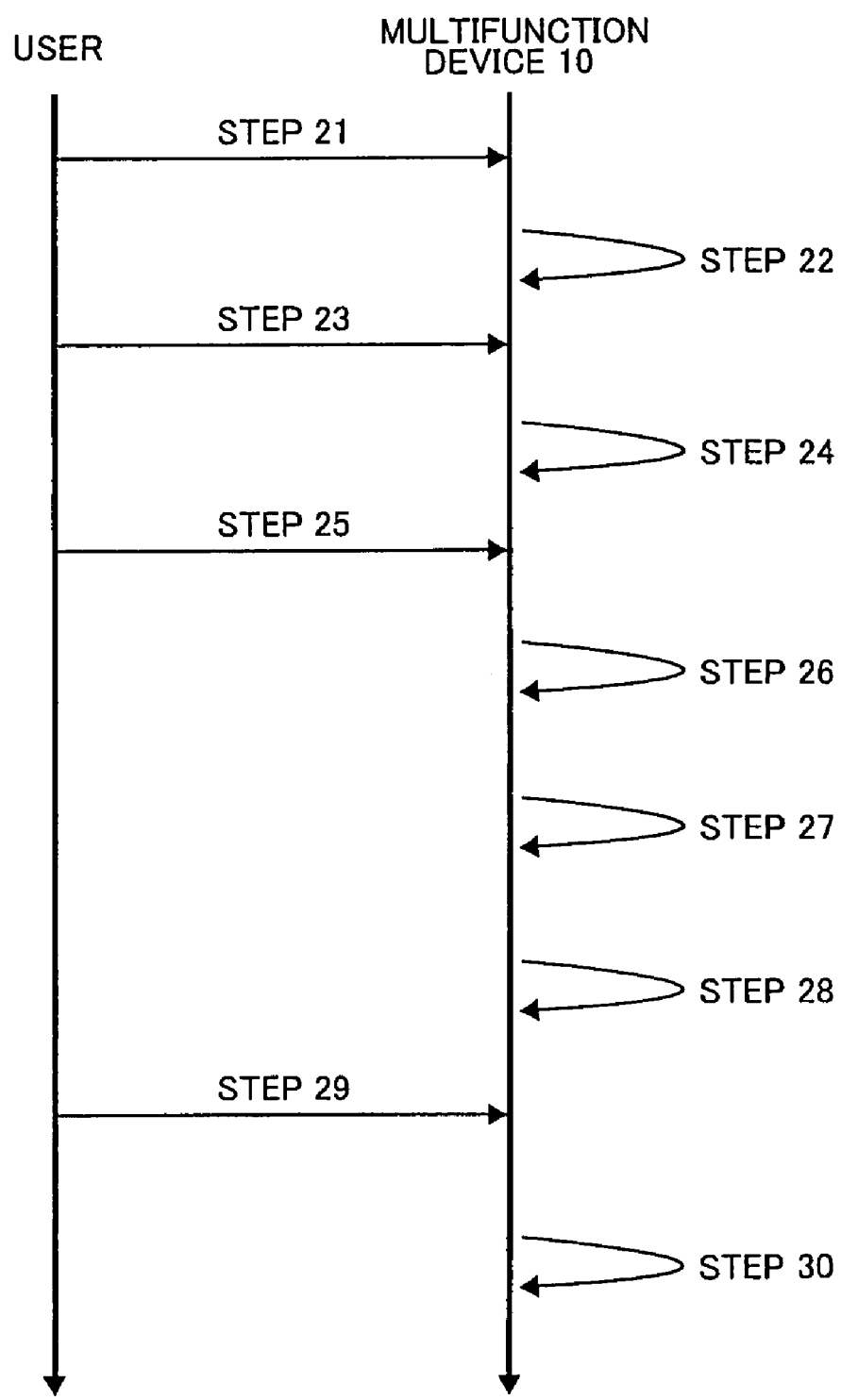

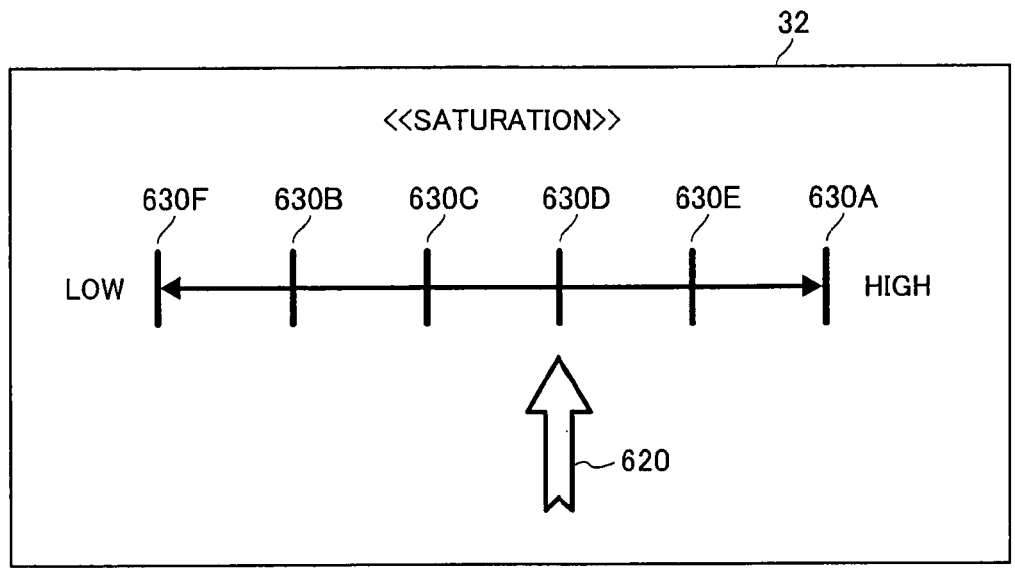
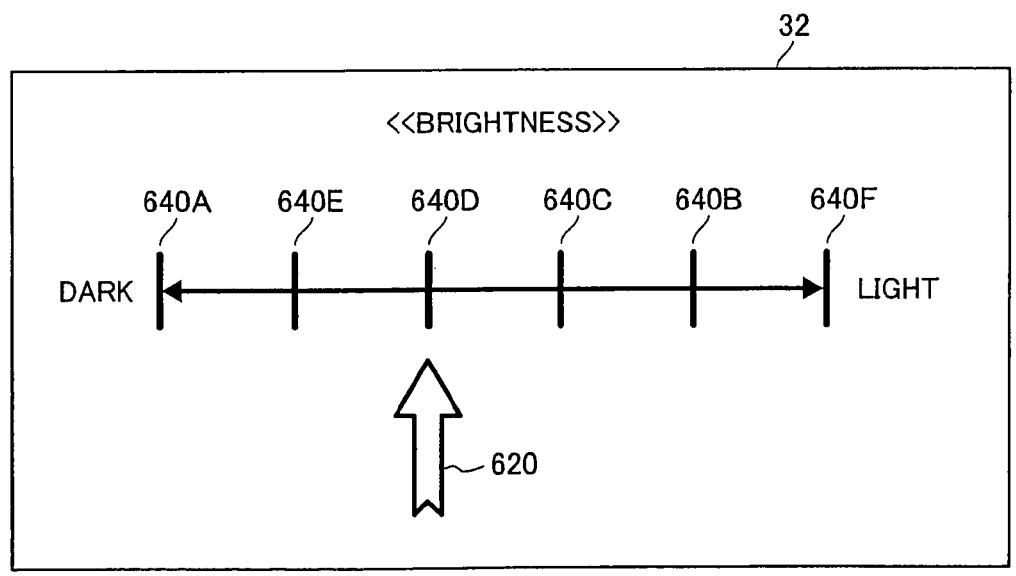

IMAGE PROCESSING DEVICE OUTPUTTING IMAGE FOR SELECTING SAMPLE IMAGE FOR IMAGE CORRECTION

CROSS REFERENCE TO RELATED APPLICATION

This application claims priority from Japanese Patent Application No. 2007-226088 filed Aug. 31, 2007, Japanese Patent Application No. 2007-226584 filed Aug. 31, 2007, and Japanese Patent Application No. 2007-226586 filed Aug. 31, 2007. The entire content of each of these priority applications is incorporated herein by reference.

TECHNICAL FIELD

The present invention relates to an image processing device and a method of image processing for performing image correction through simple operations.

BACKGROUND

As digital cameras and the like have become popular, it has become commonplace for users to print images they themselves have taken on a home printer, and to print (duplicate) images stored in a printing medium on a home printer. If the acquired images do not have the desired colors or tones in such cases, it is preferable to perform image correction on the images prior to printing.

Japanese unexamined patent application publication No. 2007-89179, for example, discloses a printing device capable of calibrating an image This printing device requires the input of calibration data for calibrating the quality of an acquired image.

SUMMARY

Since specific data must be inputted for calibrating images with the printing device described above, the user must have technical knowledge of the image; in other words, the user cannot perform sensory color adjustments (adjustments made based on the user's instincts or visual impression). Further, the user must select and specify calibration data in the above printing device, requiring more complex operations.

In view of the foregoing, it is an object of the present invention to provide an image processing device and an image processing method that enable a user to perform desired image correction instinctively through simple operations.

In order to attain the above and other objects, the invention provides an image processing device. The image processing device includes an original image inputting unit, an original-image characteristic quantity data determining unit, an outputting unit, a selecting unit, and a correcting unit. The original image inputting unit is configured so as to be capable of inputting an original image. The original-image characteristic quantity data determining unit determines original-image characteristic quantity data expressing a characteristic of the original image inputted by the original image inputting unit. The outputting unit outputs at least one set of image data or indication concerning at least one set among a plurality of sets of sample-image characteristic quantity data. The selecting unit enables a user to select one set of image data among the at least one set of image data. The correcting unit corrects the original image based on one set of sample-image characteristic quantity data corresponding to the selected set of image data and the original-image characteristic quantity data.

According to another aspect, the present invention provides an image processing method including: inputting an original image; determining original-image characteristic quantity data expressing a characteristic of the original image; outputting at least one set of image data or indication concerning at least one set among a plurality of sets of sample-image characteristic quantity data; enabling a user to select one set of image data among the at least one set of image data; and correcting the original image based on one set of sample-image characteristic quantity data corresponding to the selected set of image data and the original-image characteristic quantity data.

According to another aspect, the present invention provides a computer-readable recording medium that stores an image data processing program, the data processing program including instructions for inputting an original image; determining original-image characteristic quantity data expressing a characteristic of the original image; outputting at least one set of image data or indication concerning at least one set among a plurality of sets of sample-image characteristic quantity data; enabling a user to select one set of image data among the at least one set of image data; and correcting the original image based on one set of sample-image characteristic quantity data corresponding to the selected set of image data and the original-image characteristic quantity data.

BRIEF DESCRIPTION OF THE DRAWINGS

The particular features and advantages of the invention as well as other objects will become apparent from the following description taken in connection with the accompanying drawings, in which:

FIG. 7 is a flowchart illustrating steps in a second characteristic quantity data determination process;

FIG. 8 is a flowchart illustrating steps in a first characteristic quantity data determination process;

FIG. 9 is a graph for a hue correction table according to the first embodiment;

FIG. 16 is an explanatory diagram illustrating changes in saturation correction curves according to a fifth modification of the first embodiment;

FIG. 17 shows graphs for saturation correction tables in the B hue-region and C hue-region;

FIG. 19 is an explanatory diagram showing an overview of user operations and resulting processing on a multifunction device in a color conversion process according to a second embodiment;

FIG. 25A is an explanatory diagram showing an example of screen shots, which includes the coordinates of scale marks corresponding to representative saturation values, displayed on the display section;

FIG. 25B is an explanatory diagram showing an example of screen shots, which includes the coordinates of scale marks corresponding to representative brightness values, displayed on the display section;

DETAILED DESCRIPTION

Next, a first embodiment of the present invention will be described while referring to the accompanying drawings.

Figure 1:
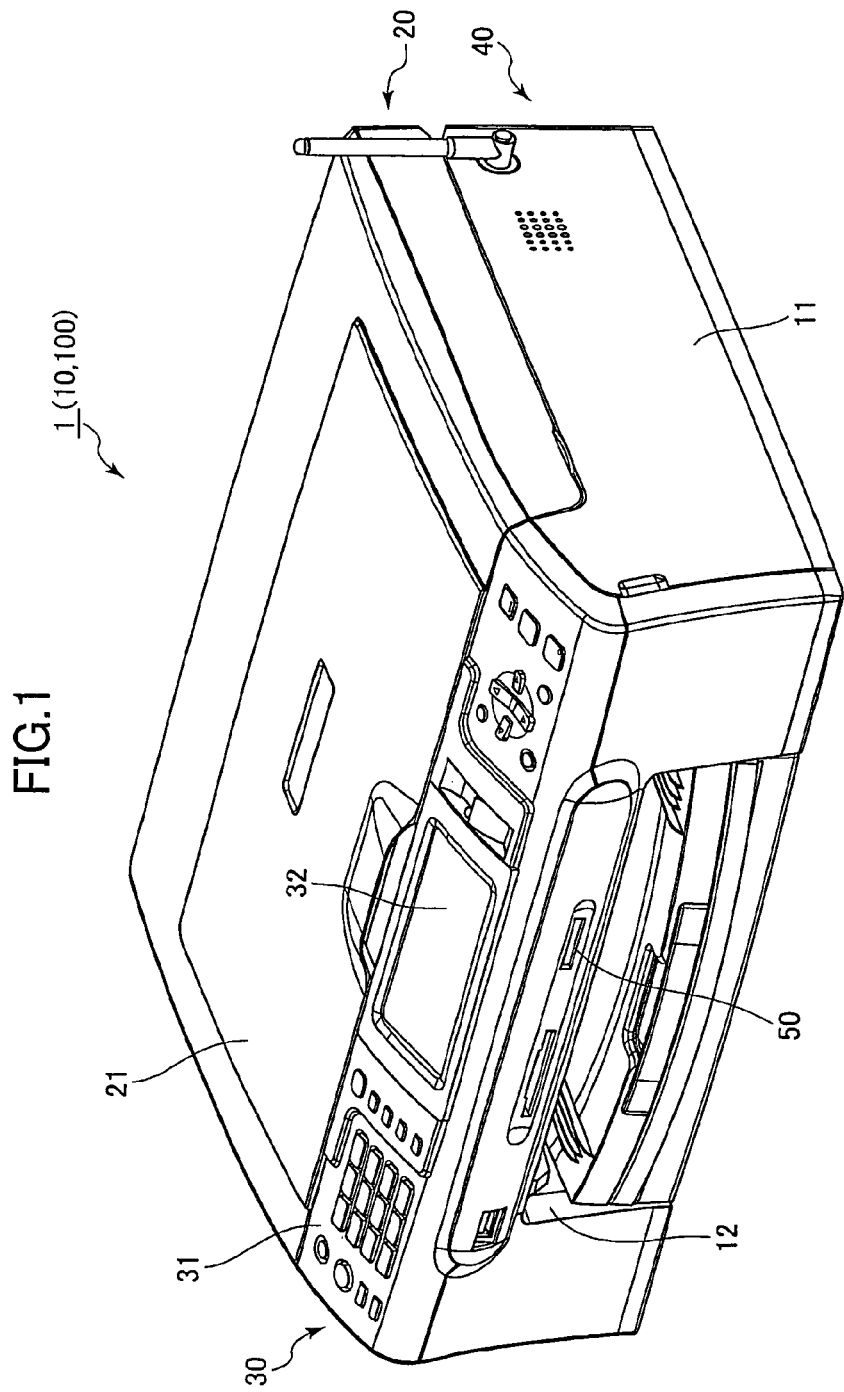
FIG. 1 is a perspective view showing the external appearance of a multifunction device according to a first embodiment of the present invention.

FIG. 1 is a perspective view showing the outer appearance of a multifunction device 1 serving as the image processing device of the first embodiment.

The multifunction device 1 is provided with various functions, including a printer function, scanner function, and color copier function. The multifunction device 1 is configured of a main casing 11, an image-reading unit 20 provided in the upper section of the main casing 11 for scanning documents, a control panel 30 provided on the front of the image-reading unit 20, and an image-printing unit 40 disposed in the bottom section of the main casing 11 for printing color images on a printing medium.

The image-reading unit 20 is a flatbed scanner that optically reads images from a document placed on a document-supporting surface configured of a glass bed. A thin plate-shaped document cover 21 covers the top of the document-supporting surface. By opening the document cover 21 upward, the user can place a document on the document-supporting surface or remove a document therefrom. The surface of the document cover 21 opposing a document positioned on the document-supporting surface is white in color. Therefore, when scanning an image with the document cover 21 closed (the state shown in FIG. 1), areas around the document on the document-supporting surface are scanned as white.

The control panel 30 provided on the front (near side) of the image-reading unit 20 is configured of an operating section 31 including various operating buttons, and a display section 32 (liquid crystal display, for example) for displaying messages, images, and other data.

The image-printing unit 40 provided below the image-reading unit 20 is capable of printing color images on paper or another printing medium. After an image is printed on the paper, the image-printing unit 40 discharges the paper through an opening 12 formed in the front surface of the main casing 11.

The multifunction device 1 also includes a card slot section 50 on the front surface of the main casing 11 above the opening 12. The card slot section 50 accepts the insertion of various memory cards (portable storage media), such as an SD Card or CompactFlash card. The multifunction device 1 also has a direct print function for directly reading from a memory card images taken by a digital still camera or the like, rather than reading images from a personal computer or other data processor, and for printing these images.

Figure 2:
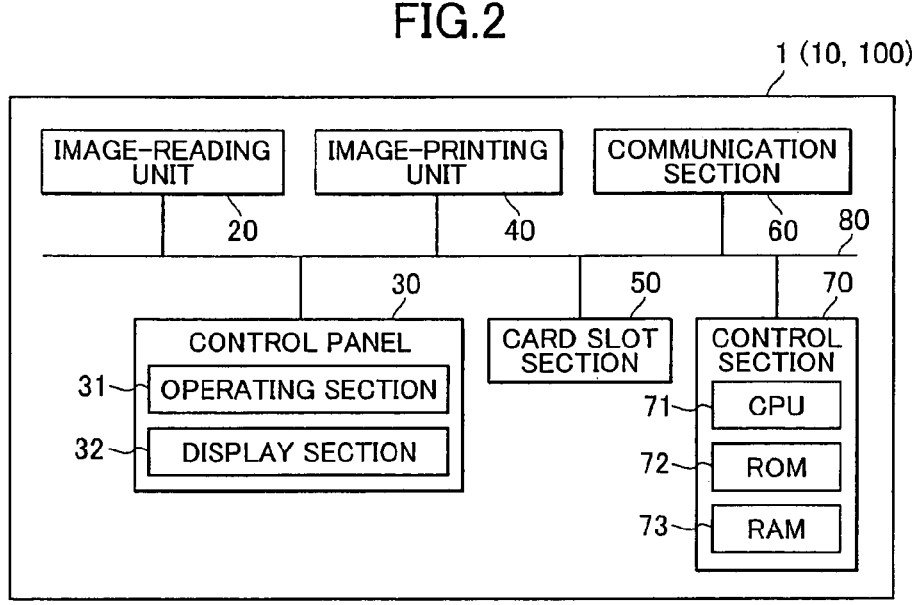
FIG. 2 is a block diagram illustrating the general structure of a control system in the multifunction device.

Next, the control system of the multifunction device 1 will be described. FIG. 2 is a block diagram showing the overall structure of this control system. As shown in FIG. 2, the multifunction device 1 includes the image-reading unit 20, control panel 30, image-printing unit 40, and card slot section 50 described above, as well as a communication section 60 and a control section 70 connected to one another via a signal line 80.

When connected to a communication cable, such as a LAN cable, the communication section 60 transmits and receives data via the communication cable. Hence, the communication section 60 functions to perform data communications with an external device such as a personal computer connected to the LAN or a Web server on the Internet.

The control section 70 is primarily configured of a microcomputer having a CPU 71, a ROM 72, and a RAM 73, and performs overall control of the components constituting the multifunction device 1. The ROM 72 stores programs executed by the CPU 71 to implement a color correction process described later.

Figure 3:
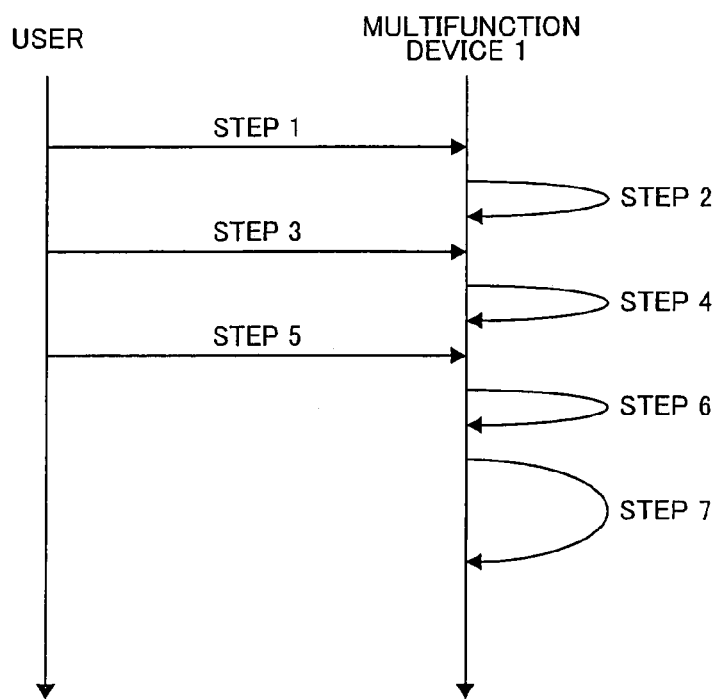
FIG. 3 is an explanatory diagram showing an overview of user operations and resulting processing on the multifunction device in a color conversion process according to the first embodiment.

Next, an overview of the color correction process performed on the multifunction device 1 will be described. The multifunction device 1 performs color correction on a user's selected image based on an image serving as a model for color correction (hereinafter referred to as a "sample image"). First, the basic steps in this color correction process will be described with reference to FIG. 3.

First, the user places a document on which a sample image is printed, such as a photograph, on the document-supporting surface of the image-reading unit 20 and operates the operating section 31 to input his/her instruction to scan the document (step 1). At this time, the multifunction device 1 reads the sample image within a specified region of the document-supporting surface (a user-specified size, such as L-size (photo paper), A4 size, or the like) (step 2). Through these processes, sample image is read from the document resting on the document-supporting surface.

Next, the user inserts a memory card storing images as candidates for color correction into the card slot section 50 (step 3). The multifunction device 1 recognizes the inserted memory card and prompts the user to select an image to be subjected to color correction from among the images stored on the memory card (step 4). Here, any suitable process known in the art may be employed as the process for prompting the user to select an image, such as a process for displaying images stored in the memory card on the display section 32 and enabling the user to select an image through operations on the operating section 31.

Once the user has selected an image to be subjected to color correction (step 5), the multifunction device 1 reads the selected image (step 6). In the following description, the selected image will be referred to as the "original image."

Subsequently, the multifunction device 1 performs a process to correct the original image read from the memory card using the sample image read from the image-reading unit 20 as a model (step 7). In this procedure, the original image is read from the memory card after reading the sample images from the image-reading unit 20, but the present invention is not limited to this order. It is also possible to read the original image from the memory card first and subsequently read the sample image with the image-reading unit 20.

Through this color correction process, the user can execute a color correction process on an original image that is intuitively based on a sample image and requires only simple operations to perform.

In order to accomplish more desirable color correction, the multifunction device 1 according to the embodiment can perform a color correction process using a plurality of sample images, rather than using only a single sample image.

The multifunction device 1 according to the first embodiment can input a plurality of sample images for a single original image and print thumbnail image of the sample images and the results of correction based on the sample images as an index. In this way, the user can more efficiently select a sample image from which the desired results can be obtained.

Next, a detailed description of the color correction process executed on the multifunction device 1 of the embodiment will be described.

Figure 4:
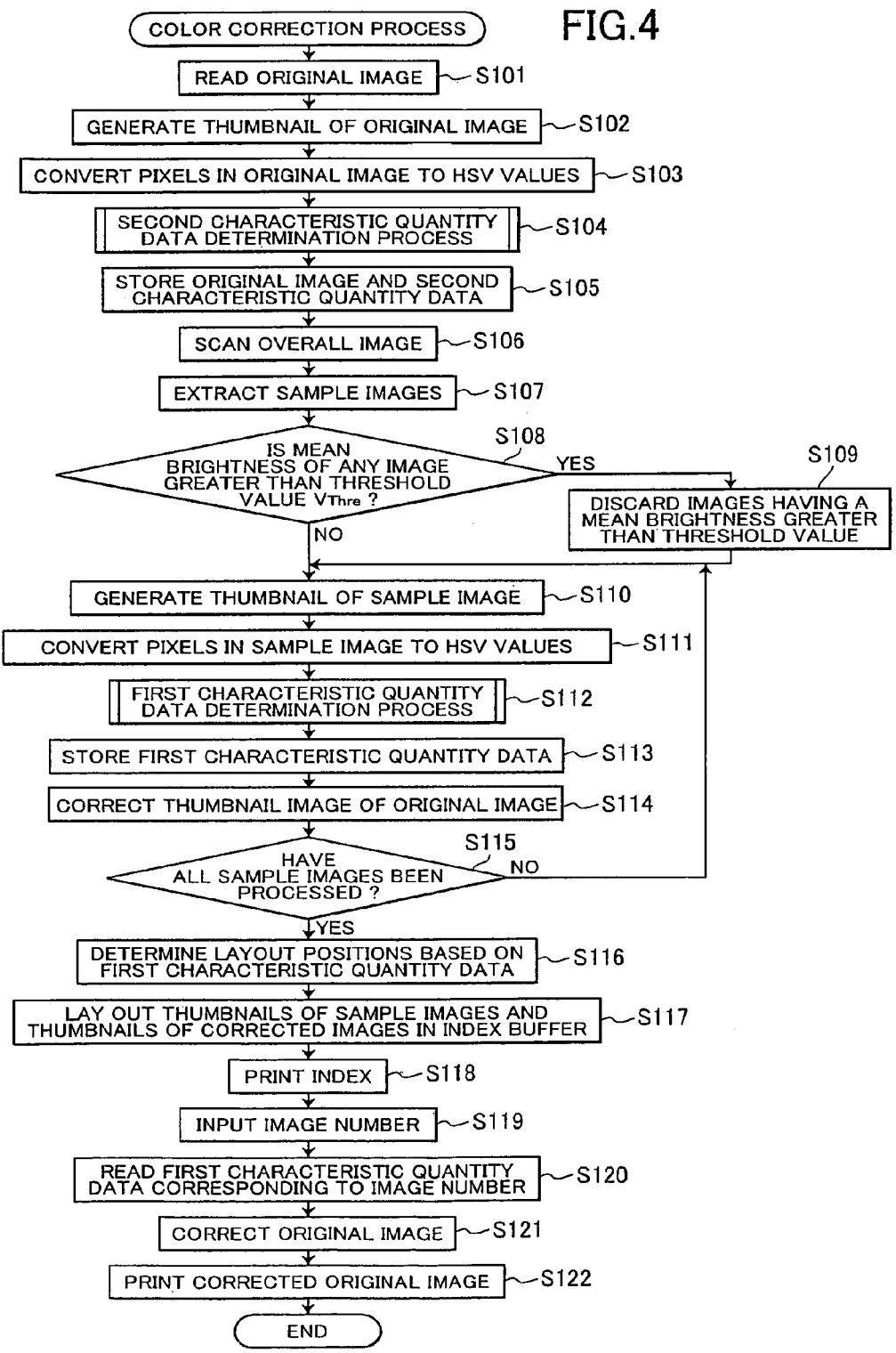
FIG. 4 is a flowchart illustrating steps in the color conversion process according to the first embodiment.

FIG. 4 is a flowchart illustrating steps in the color correction process executed by the CPU 71 of the multifunction device 1. In S101 at the beginning of this color correction process, the CPU 71 scans the entire region of the document-supporting surface in the image-reading unit 20 as an overall image. In the embodiment, the format for the scanned image data is the RGB format, but may be another format.

In S102 the CPU 71 generates a thumbnail image of the original image read in S101. This thumbnail image of the original image will be referred to as a "thumbnail original image". Specifically, the CPU 71 performs a size conversion process (reducing process) to reduce the original image to a preset size for a thumbnail image. Since original images are generally larger than the thumbnail image size, a reducing process is described here as the size conversion process. However, if the original image is smaller than the thumbnail image size, an enlarging process is performed as the size conversion process. Size conversion may be performed using the nearest-neighbor algorithm, bilinear or bicubic interpolation, and, for reduction only, the average pixel technique.

In S103 the CPU 71 performs a process to convert each pixel constituting the original image read in S101 (rather than the thumbnail original image generated in S102) to a set of HSV parameters, where H is a value from 0 to 360 and S and V are values between 0 and 1. The method of conversion will be described in greater detail later.

In S104 the CPU 71 performs a second characteristic quantity data determination process for determining a set of second characteristic quantity data representing a characteristic of the original image based on the HSV parameters obtained in the conversion process of S103. The second characteristic quantity data determination process will be described later in greater detail with reference to FIG. 7.

In S105 the CPU 71 stores data of the original image read in S101 and the second characteristic quantity data determined in S104 in a storage area of the RAM 73. This storage area is allocated for saving stored data at least until the end of the current color correction process and cannot be overwritten by other data during this period. In other words, this configuration ensures that the original image and the second characteristic quantity data will remain saved until the end of the current color correction process. Here, the storing area is not limited to the RAM 73, but may be a hard disk, for example, if the multifunction device 1 is provided with a hard disk.

In S106, the CPU 71 scans the entire region of the document-supporting surface in the image-reading unit 20 as an overall image. In the first embodiment, the format for the scanned image data is the RGB format, but the present invention is not limited to this format.

Figure 5A:
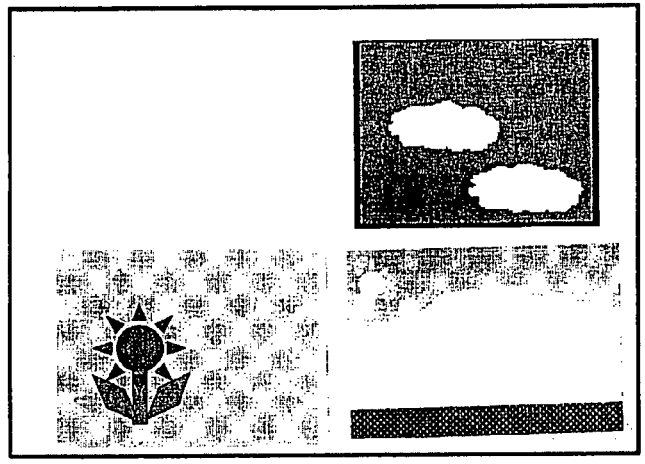
FIG. 5A is an explanatory diagram showing a document-supporting surface of the multifunction device when a plurality of documents are placed on the document-supporting surface.
Figure 5B:
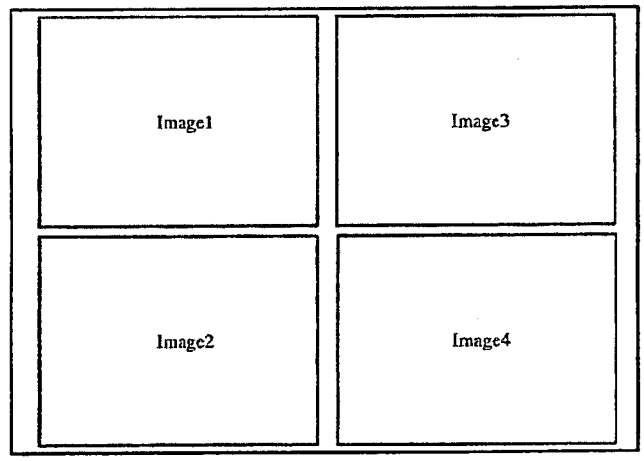
FIG. 5B is an explanatory diagram showing scanning regions on the document-supporting surface.
Figure 5C:
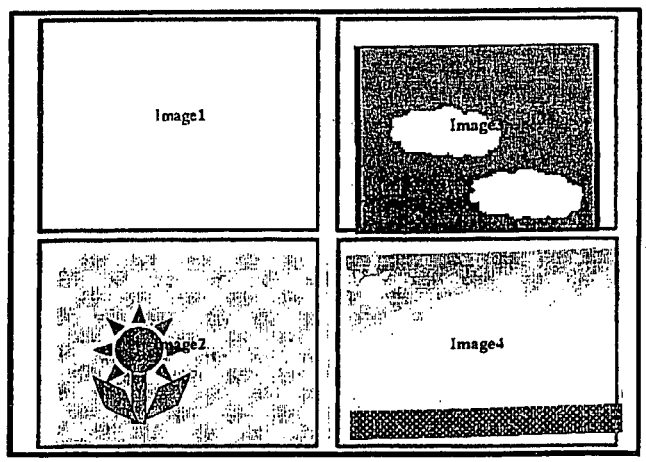
FIG. 5C is an explanatory diagram showing a plurality of recognized sample images.

In S107 the CPU 71 extracts sample images from the overall image scanned in S106. In the first embodiment, the document-supporting surface has been divided into a plurality of scanning regions, and the CPU 71 can recognize independent sample images scanned within the individual scanning regions of the document-supporting surface. For example, the document-supporting surface can be divided in half both vertically and horizontally to produce a total of four scanning regions, as shown in FIG. 5B. In this case, if a plurality (three in the example of FIG. 5A) of photographs is placed on the document-supporting surface, the CPU 71 recognizes the image of each photograph as an individual image as illustrated in FIG. 5C. At this time, a scanning region without a photograph (Image1 in the example of FIG. 5C) is still recognized as an image (a white image since the inside of the document cover 21 is white). The number of scanning regions described above may be preset as a default or specified by the user.

In S108 the CPU 71 determines whether a mean brightness $V_{mean}$ of each sample image (a mean value of brightness values of all the pixels in the sample image) determined in S107 is greater than or equal to a predetermined threshold value $V_{Thre}$ (0.97, for example). Here, the threshold value $V_{Thre}$ is set as a reference value for determining whether a document has been placed on the document-supporting surface of the image-reading unit 20. When mean brightness $V_{mean}$ of some sample image is at least the threshold value $V_{Thre}$ (i.e., when it is determined that the image is white only), there is a high probability that no document has been placed on the document-supporting surface at the corresponding scanning region.

If the CPU 71 determines in S10 that there exists a sample image having a mean brightness $V_{mean}$ greater than or equal to the threshold value $V_{Thre}$ (S108: YES), in S109 the CPU 71 discards the sample image and advances to S110. In the example of FIGS. 5A-5C described above, the CPU 71 would remove the white image scanned as Image1 from among the four scanning regions.

However, if the CPU 71 determines in S108 that there exists no sample image having a mean brightness $V_{mean}$ greater than or equal to the threshold value $V_{Thre}$ (S808: NO), in S110 the CPU 71 advance to S110.

In S110 the CPU 71 selects one of the plurality of sample images extracted in S106-S109 (a sample image that has not yet undergone the process in S110-S114) and generates a thumbnail image of this sample image. This thumbnail image of the sample image will be referred to as a "thumbnail sample image".

In S111 the CPU 71 performs a process to convert pixels constituting the sample image (rather than the thumbnail sample image generated in S110) selected as the processing target in S110 into a set of HSV parameters in the same manner of S103.

In S112 the CPU 71 performs a first characteristic quantity data determination process for determining a set of first characteristic quantity data representing a characteristic of the sample image based on the HSV parameters obtained in the conversion process of S111. The first characteristic quantity data determination process will be described later in greater detail with reference to FIG. 8.

In S113 the CPU 71 stores the first characteristic quantity data determined in S112 in the storage area of the RAM 73 described in S105 in association with identification data for the sample image being processed. The identification data for the sample image is data capable of identifying the sample image being processed from among the plurality of sample images extracted as processing targets in S106-S109, such as a number indicating the order of the sample image being processed. If first characteristic quantity data for a different sample image is already stored in the RAM 73, the CPU 71 maintains the saved state of this first characteristic quantity data and adds the new first characteristic quantity data. Hence, by repeating the process in S110-S114, the CPU 71 stores a plurality of sets of first characteristic quantity data for a plurality of sample images in the RAM 73.

In S114 the CPU 71 corrects the thumbnail original image generated in S102 based on the first characteristic quantity data determined in S112 (the first characteristic quantity data of the sample image targeted for processing) and the second characteristic quantity data determined in S104. Hereinafter, the thumbnail original image corrected in S114 using the sample image as model is referred to as the "corrected thumbnail image". This method of correction will be described later in greater detail.

In S115 the CPU 71 determines whether the process in S110-S114 has been performed for all sample images. The CPU 71 performs this determination based on whether the process has been repeated a number of times equivalent to the number of sample images extracted in S106-S109.

If the CPU 71 determines in S115 that the process has not been performed for all sample images (i.e., there remain unprocessed sample images; S115: NO), the CPU 71 returns to S110. By repeatedly performing the processes of S110-S315, a plurality of sets of thumbnail images are generated. Each set of images consists of a thumbnail sample image and a corrected thumbnail image that are generated in S110 and S114 of the same loop of S110-S315. If the process has been performed for all sample images (S115: YES), in S116 the CPU 71 determines, based on the first characteristic quantity data of the sample images, the layout positions indicating how the plurality of sets of thumbnail images should be arranged on an index. The CPU 71 determines the image numbers (consecutive natural number in this example) indicative of the order in which the plurality of sets of thumbnail images should be arranged in the index. The details of this process will be described later in greater detail.

Figure 6:
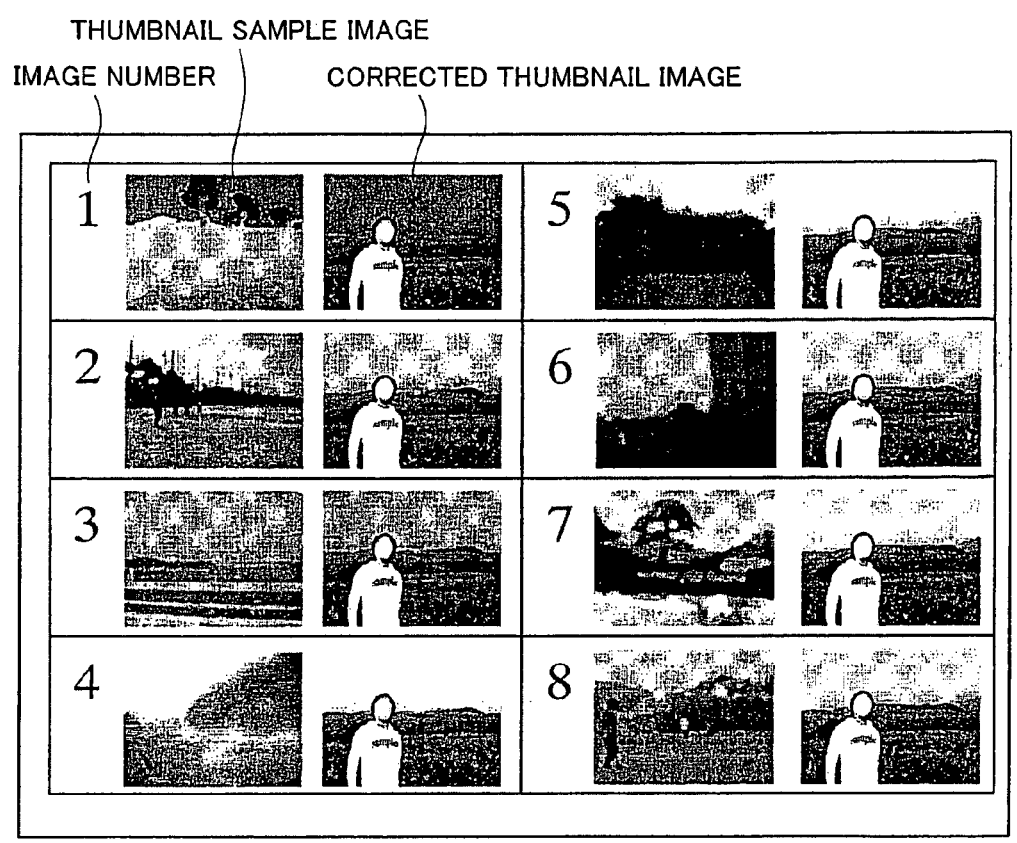
FIG. 6 is an explanatory diagram showing an index.

In S117 the CPU 71 lays out the plurality of sets of thumbnail images in an index buffer based on the layout positions determined in S116. More specifically, the CPU 71 arranges the plurality of sets of images, each of which includes the thumbnail sample image and the corrected thumbnail image illustrating the results of color correction based on the corresponding sample image, so that each corrected thumbnail image is located to the right of the corresponding thumbnail sample image as shown in FIG. 6. The CPU 71 further arranges the image number (one of consecutive natural numbers in this example) to the left side of the thumbnail sample image in each thumbnail image set, as shown in FIG. 6. The index buffer is a storage area allocated in the RAM 73 for temporarily storing images to be printed as an index.

In S118 the CPU 71 prints the plurality of sets of thumbnail images stored in the index buffer (FIG. 6) with the image-printing unit 40. In this way, the user can determine at a glance what color correction results have been obtained for each sample image. By inputting a number using the operating section 31 for the image number corresponding to the one thumbnail image set that shows his/her desired results, the user can control the multifunction device 1 to correct the original image according to the sample image corresponding to the image number.

Specifically, in S119 the CPU 71 inputs the image number based on the user's operation on the operating section 31. In S120 the CPU 71 reads the first characteristic quantity data for the sample image corresponding to the image number inputted in S119 (the first characteristic quantity data stored in association with the identification number for the sample image in S113) from the storage area in the RAM 73.

In S121 the CPU 71 corrects the original image (rather than the thumbnail original image) stored in the storage area based on the first characteristic quantity data read in S120 and the second characteristic quantity data stored in the RAM 73. The method of correction will be described later in greater detail.

In S122 the CPU 71 controls the image-printing unit 40 to print the original image corrected in S121, and subsequently ends the current color correction process.

Next, a detailed description of the process in S103 will be described. In S103, the CPU 71 performs a process to convert each pixel constituting the original image read in S101 (rather than the thumbnail image generated in S102) to a set of HSV parameters, where H is a value from 0 to 360 and S and V are values between 0 and 1.

Method of RGB→HSV Conversion

First, the value "V" is calculated by the following formula:

$$V = \max(R \div 255, G \div 255, B \div 255),$$

wherein max(a, b, c) denotes the largest value among a, b, and c.

Based on the determined value "V", the value "S" is calculated by the following formulas:

when $V$ is 0, $S = 0$; and when $V$ is not 0, $S = \{V - \min(R \div 255, G \div 255, B \div 255)\} \div V,$ wherein min(a, b, c) denotes the smallest value among a, b, and c.

Based on the value "V", the value "r", "g", and "b" are determined by the following formulas:

when $\{V-\min(R\div255, G\div255, B\div255)\}$ is not 0, $r=(V-R\div255)\div(V-\min(R\div255, B\div255, B\div255))$, $g=(V-G\div255)\div(V-\min(R\div255, G\div255, B\div255))$, $b=(V-B\div255)\div(V-\min(R\div255, G\div255, B\div255))$; and when $\{V-\min(R\div255, G\div255, B\div255)\}$ is 0, $r\div0$, $g=0$ $b=0$.

Based on the values "r", "g", and "b", the value "H" is calculated by the following formulas:

when $V=R\div255, H=60\times(b-g)$;

when $V=G\div255, H=60\times(2+r-g)$; and when $V=B\div255, H=60\times(4+g-r)$.

Next, the second characteristic data determination process of S104 in FIG. 4 for determining the second characteristic quantity data from the original image will be described with reference to FIG. 7. FIG. 7 is a flowchart illustrating steps in the second characteristic quantity data determination process. In the following process, it will be assumed that H takes on a value of at least −30 and less than 330. When H does not fall within this range, H is adjusted to a value within the range according to a suitable conversion, such as H=H+360×n or H=H−360×n, where n is an integer.

In S201 of the second characteristic quantity data determination process, the CPU 71 divides the original image into a plurality of hue-regions (six commonly used hue regions in this example). Specifically, each of the pixels in the original image is allocated into either one of the following six hue-regions based on its H value:
R hue-region: grater than or equal to −30 and less than 30
Y hue-region: grater than or equal to 30 and less than 90
G hue-region: grater than or equal to 90 and less than 150
C hue-region: grater than or equal to 150 and less than 210
B hue-region: grater than or equal to 210 and less than 270
M hue-region: grater than or equal to 270 and less than 330

Hence, the CPU 71 performs a process to sort all the pixels of the original image into six classifications based on the above classification criteria for the hue value. The correspondence between each hue-region and the H value given above is merely an example and may be modified as appropriate.

In S202 the CPU 71 calculates representative values (HSV values) for each hue-region in which pixels have been sorted in S201 and the percentage of the original image that each hue-region occupies.

The representative values (HSV values) for each hue-region are defined as follows.
Representative values for the R hue-region: iHr, iSr, iVr
Representative values for the G hue-region: iHg, iSg, iVg
Representative values for the B hue-region: iHb, iSb, iVb
Representative values for the C hue-region: iHc, iSc, iVc
Representative values for the M hue-region: iHm, iSm, iVm
Representative values for the Y hue-region; iHy, iSy, iVy Here, the representative values in each hue-region are average values of the HSV values of all the pixels allocated in the subject hue-region. The representative values for each hue-region may be median values or middle values of the HSV values of all the pixels in the subject hue-region.

The percentage that each hue-region occupies in the original image is defined as follows:
Percentage that the R hue-region occupies in the original image: iRateR
Percentage that the G hue-region occupies in the original image: iRateG
Percentage that the B hue-region occupies in the original image: iRateB
Percentage that the C hue-region occupies in the original image: iRateC
Percentage that the M hue-region occupies in the original is image: iRateM
Percentage that the Y hue-region occupies in the original image: iRateY The percentage for the R hue-region, for example, may be defined as iRateR=(number of pixels in the R hue-region of the original image)÷(total number of pixels in the original image), or may be defined according to another equation.

Next, the first characteristic data determination process of S112 in FIG. 4 for determining the first characteristic quantity data from the sample image will be described with reference to FIG. 8. FIG. 8 is a flowchart illustrating steps in the first characteristic quantity data determination process. Similarly to the pixels in the original image, all the pixels in the sample image are sorted in the six hue-regions R, X, B, C, M and Y in the same manner as S104. In S301 and S302, similarly to the pixels in the original image, all the pixels in the sample image are sorted in the six hue-regions R, G, B, C, M and Y in the same manner as S201 and S202 of FIG. 7. It is noted that the first characteristic quantity data obtained for the sample image in S112 includes the following data:
Representative values for the R hue-region: sHr, sSr, sVr
Representative values for the G hue-region: sHg, sSg, sVg
Representative values for the B hue-region: sHb, sSb, sVb
Representative values for the C hue-region: sHc, sSc, sVc
Representative values for the M hue-region: sHm, sSm, sVm
Representative values for the Y hue-region: sHy, sSy, sVy The percentage that each hue-region occupies in the sample image is defined as follows:
Percentage that the R hue-region occupies in the sample image: sRateR
Percentage that the G hue-region occupies in the sample image: sRateG
Percentage that the B hue-region occupies in the sample image: sRateB
Percentage that the C hue-region occupies in the sample image: sRateC
Percentage that the M hue-region occupies in the sample image: sRateM
Percentage that the Y hue-region occupies in the sample image: sRateY Next, the process performed in S114 of FIG. 4 will be described in detail. In S411 the CPU 71 corrects the thumbnail image of original image generated in S102, based on the first and second characteristic quantity data. In this process, the multifunction device 1 converts the H value, S value, and V value of each pixel in the thumbnail image of original image.

First, the correction process for the H value of each pixel in the thumbnail image of original image will be described. Representative H values for all the hue-regions determined in S104 and S112 are plotted in a graph, as shown in FIG. 9, with the X-axis denoting the representative H values of the original image determined in S104 and the Y-axis denoting the representative H values (denoted by H') of the first characteristic quantity data determined in S112. Subsequently, a hue conversion table based on the graph in FIG. 9 is created as indicated by a broken line using linear interpolation, for example, between the plotted points.

The H value of each pixel in the thumbnail image of original image is corrected into a corrected H' value by applying the hue conversion table to the H value in each pixel. More specifically, the corrected H' value is calculated according to the following equation:

$$H' = (y2-y1) \div (x2-x1) \times H - (y2-y1) \div (x2-x1) \times x2 + y2 \quad \text{(Equation 1)}$$

Here, H' is set to H'−360 when H'>360.
Here, x1, x2, y1, and y2 are defined as follows.
When H<iHr, $$(x1,y1) = (iHm-360, sHm-360), \text{ and}$$

$$(x2,y2) = (iHr, sHr).$$

When iHr≦H<iHy, $$(x1,y1) = (iHr, sHr), \text{ and}$$

$$(x2,y2) = (iHy, sHy)$$

When iHy≦H<iHg, $$(x1,y1) = (iHy, sHy), \text{ and}$$

$$(x2,y2) = (iHg, sHg).$$

When iHg≦H<iHc, $$(x1,y1) = (iHg, sHg), \text{ and}$$

$$(x2,y2) = (iHc, sHc).$$

When iHc≦H<iHb, $$(x1,y1) = (iHc, sHc), \text{ and}$$

$$(x2,y2) = (iHb, sHb).$$

When iHb≦H<iHm, $$(x1,y1) = (iHb, sHb), \text{ and}$$

$$(x2,y2) = (iHm, sHm).$$

When iHm≦H, $$(x1,y1) = (iHm, sHm), \text{ and}$$

$$(x2,y2) = (iHr+360, sHr+360).$$

Next, correction of the S value and V value in each pixel will be described. The S and V values of each pixel in the thumbnail image of original image are corrected in a manner that is determined dependent on the hue-region in which the hue value H of the subject pixel is allocated. For example, values "S" and "V" for a pixel, whose H value is allocated in the R hue-region, are converted into corrected values "S" and "V" by the following equations:
When S≦iSr, $$S' = S \times (sSr \div iSr) \quad \text{(Equation 2).}$$

When S>iSr, $$S' = 1 + (S-1) \times \{(1-sSr) \div (1-iSr)\} \quad \text{(Equation 3).}$$

When V≦iVr, $$V' = V \times (sVr \div iVr) \quad \text{(Equation 4).}$$

When V>iVr, $$V' = 1 + (V-1) \times \{(1-sVr) \div (1-iVr)\} \quad \text{(Equation 5).}$$

S and V values for pixels, whose H values are allocated in other hue-regions, can be similarly calculated. Below, a conversion table defined by the above-described conversion method for S values is referred to as a saturation conversion table, while a conversion table defined by the above-described conversion method for the V value is referred to as a brightness conversion table.

Next, the HSV values of each pixel that has been converted as described above is converted to a format (RGB values, for example) suitable for the image printing section 40. The following method of conversion is merely an example, and it should be apparent that conversion may be performed according to another method.

Below, in, fl, m, and n are parameters used in the process of calculating RGB values from HSV values. Here, in will be the integer portion of (H'÷60) and fl the decimal portion of (H'÷60).

When in is even, fl=1−fl.

$$m = V' \times (1-S')$$

$$n = V' \times (1-S' \times fl)$$

When in is 0, $$R = V' \times 255,$$

$$G = n \times 255, \text{ and}$$

$$B = m \times 255.$$

When in is 1, $$R = n \times 255,$$

$$G = V' \times 255, \text{ and}$$

$$B = m \times 255.$$

When in is 2, $$R = m \times 255,$$

$$G = V' \times 255, \text{ and}$$

$$B = n \times 255.$$

When in is 3, $$R = m \times 255,$$

$$G = n \times 255, \text{ and}$$

$$B = V' \times 255.$$

When in is 4, $$R = n \times 255,$$

$$G = m \times 255, \text{ and}$$

$$B = V' \times 255.$$

When in is 5, $$R = V' \times 255,$$

$$G = m \times 255, \text{ and}$$

$$B = n \times 255.$$

It is noted that the conversion of HSV values back to RGB values may be executed not in S114, but in S118. The RGB values are subjected to the printing process in S118.

The process of S121 is the same process as the S114 except for using H, S, V values of each pixel of the original image read in S101 rather than the thumbnail image generated in S110.

By performing the image correction process described above, the multifunction device 1 can convert color tones in the original image to color tones of the sample image for each hue-region divided based on the H value.

Next, the process for setting layout positions performed in S116 of the color correction process in FIG. 4 will be described. Here, four methods (A)-(D) are given as examples. In each method, an order, in which sample images should be arranged, is determined. Based on the order, a layout, in which the resultant image sets should be arranged in the index, is determined.

As an example, three sample images A, B, and C are inputted, and the percentages of the original image and each sample image A, B, and C occupied by each hue-region are as listed below. It is noted that this example will be used for description of methods (A)-(C).

Original image includes the following parameters:
Percentage of original image occupied by the R hue-region: iRateR=40%
Percentage of original image occupied by the G hue-region: iRateG=15%
Percentage of original image occupied by the B hue-region: iRateB=20%
Percentage of original image occupied by the C hue-region: iRateC=10%
Percentage of original image occupied by the M hue-region: iRateM=8%
Percentage of original image occupied by the Y hue-region: iRateY=7%
Sample Image A includes the following parameters:
Percentage of sample image A occupied by the R hue-region: sRateR_A=25%
Percentage of sample image A occupied by the G hue-region: sRateG_A=15%
Percentage of sample image A occupied by the B hue-region: sRateB_A=30%
Percentage of sample image A occupied by the C hue-region: sRateC_A=10%
Percentage of sample image A occupied by the M hue-region: sRateM_A=8%
Percentage of sample image A occupied by the Y hue-region: sRateY_A=12%
Sample Image B includes the following parameters:
Percentage of sample image B occupied by the R hue-region: sRateR_B=30%
Percentage of sample image B occupied by the C hue-region: sRateG_B=12%
Percentage of sample image B occupied by the B hue-region: sRateB_B=8%
Percentage of sample image B occupied by the C hue-region: sRateC_B=15%
Percentage of sample image B occupied by the M hue-region: sRateM_B=10%
Percentage of sample image B occupied by the Y hue-region: sRateY_B=25%
Sample Image C includes the following parameters:
Percentage of sample image C occupied by the R hue-region: sRateR_C=8%
Percentage of sample image C occupied by the G hue-region: sRateG_C=10%
Percentage of sample image C occupied by the B hue-region; sRateB_C=12%
Percentage of sample image C occupied by the C hue-region: sRateC_C=25%
Percentage of sample image C occupied by the M hue-region: sRateM_C=30%
Percentage of sample image C occupied by the Y hue-region: sRateY_C=15%

(A) Method of Comparing and Sorting Ratios of Respective hue-regions (A-1) First, the percentages of the original image occupied by hue-regions are sorted in descending order and assigned numbers in this order, as shown in the following example.
 [1] iRateR=40%
 [2] iRateB=20%
 [3] iRateG=15%
 [4] iRateC=10%
 [5] iRateM=8%
 [6] iRateY=7%

(A-2) Next, the percentages of each of the sample images A, B, and C occupied by the hue-regions are numbered according to the order specified in (A-1).

The percentages of sample image A occupied by the hue-regions are assigned numbers, as shown in the following example.
 [1] sRateR_A=25%
 [2] sRateB_A=30%
 [3] aRateG_A=15%
 [4] sRateC_A=10%
 [5] sRateM_A=8%
 [6] sRateY_A=12%

The percentages of sample image B occupied by the hue-regions are assigned numbers, as shown in the following example.
 [1] sRateR_B=30%
 [2] sRateB_B=8%
 [3] sRateG_B=12%
 [4] sRateC_B=15%
 [5] sRateM_B=10%
 [6] sRateY_B=25%

The percentages of sample image C occupied by the hue-regions are assigned numbers, as shown in the following example.
 [1] sRateR_C=8%
 [2] sRateB_C=12%
 [3] sRateG_C=10%
 [4] sRateC_C=25%
 [5] sRateM_C=30%
 [6] sRateY_C=15%

(A-3) Next, sample images A, B, and C are sorted in order of images most closely resembling the original image by comparing the percentage (iRate) of the original image occupied by each hue-region with the percentage (skate) of each sample image A, B, and C occupied by each hue-region. Specifically, the ratio of the hue-region, to which assigned is the smallest number, is compared for all of the sample images A, B, and C, and the sample images are sorted based on the ratios closest to the ratio for the same hue-region in the original image. When two or more sample images have the same ratio, the ratios of the hue-region, to which assigned is the next smallest number, are compared. Similarly, the sorting process can be extended to the third and fourth largest hue-regions.

In this example, the sample images are sorted into the following order based on the order in which the ratios of the R hue-region resemble the percentage iRateR (40%) of the original image occupied by the R hue-region.
 [1] Sample image B: sRateR_B (30%)
 [2] Sample image A: sRateR_A (25%)
 [3] Sample image C: sRateR_C (8%)

Displaying sample images in this order improves the efficiency of user selection. In this case, three thumbnail image sets that are generated based on the sample images B, A, and C are arranged in this order on the index.

(B) Method of Sorting Sample Images in Order of RGB Values (B-1) First, representative HSV values for each hue-region of the original image and each sample image are converted from HSV values to RGB values.

(B-2) Next, the percentages (iRate) of the original image occupied by the hue-regions are sorted in descending order.

(B-3) Next, the sample images A, B, and C are sorted according to the representative values (RGB values) closest to those of the original image in the hue-region found to have the largest ratio in (B-2).

Assume now that the R hue-region is the largest hue-region in the original image similarly to the example described for the method (A). The representative values for the R hue-region of the original image are now represented by the following set of RGB values: (iRr-region, iGr-region, iBr-region). The representative values for the R hue-regions of the sample images A, B, and C are now represented by the following sets of RGB values: (sRr-region_A, sGr-region_A, sBr-region_A); (sRr-region_B, sGr-region_B, sBr-region_B); and (sRr-region_C, sGr-region_C, sBr-region_C), respectively Euclidean distances, defined in the RGB color space, of the representative values for the R hue-region of the sample images A, B, C from the representative values for the P hue-region of the original image are represented by: Dr-region_A; Dr-region_B, and Dr-region_C. In this case, the sample images A, B, C are sorted in the order of B, A, C, if the Euclidean distances satisfy the following inequality: Dr-region_B<Dr-region_A<Dr-region_C.

(C) Method of Sorting Sample Images Using Labels

The process for determining the layout position according to the methods (A) and (B) described above targets all sample images stored in the RAM 73. Consequently, as the number of sample images increases, more time is required for sorting the sample images based on characteristic quantity data to set the layout position, potentially leading to a large time delay before index are presented to the user. In the method (c), this process can be shortened by labeling the sample images in advance and targeting only sample images with specific labels in the process for determining the layout position.

Specifically, labels indicating hue-regions with the largest area in the respective sample images are applied to the sample images. Hence, the following labels are attached to sample images A, B, and C in the above-described example.

Sample image A: B label
Sample image B: R label
Sample image C: M label

In this example, since the R hue-region is the largest hue-region in the original image of the above example, only the sample image B is printed on the index.

Further, multiple labels may be applied to each single sample image when the sample image has another hue-region with substantially the same area as the hue-region having the largest hue-region. In this case, the setting indicating "another hue-region has substantially the same as the largest hue-region" may be a percentage difference between the areas of the two hue-regions falling within the range 3-5%, for example, but is not limited to this range.

The following labels are applied when the above setting is 5%.

Sample image A: R label, B label
Sample image B: R label, Y label
Sample image C: C label, M label Since the R hue-region is the largest hue-region in the original image of the above example, only a group of sample images with the R label are selected, and the sample image C is omitted. In this example, sample images A and B are sorted into the following order.

[1] Sample image B
[2] Sample image A

The method of determining the order within a group of the selected sample images is identical to the method (A).

It is also possible to apply labels indicating hue-regions having areas greater than or equal to a prescribed value (30%, for example). In this case, the following labels area applied:

Sample image A: B label
Sample image B: R label
Sample image C: M label

So, only the sample image B is printed on the index because the R hue-region is the largest in the original image (D) Method of Sorting Sample Images Using Labels In the methods (A)-(B), all sample images are sorted, even when some of the sample images closely resemble one another. As described above, the user inputs sample images by using the image-reading unit 20. Accordingly, it is possible that the user may input sample images with similar characteristics. However, printing a plurality of sample images with similar characteristics is not preferable from the perspective of printing efficiency.

This method (D) can omit either one of the sample images that have first characteristic quantity data similar to one another. The criteria for determining whether images have similar characteristic quantity data may be that the differences between percentages of all of their hue-regions fall within a prescribed range and that the differences between representative values for all of their hue-regions fall within a prescribed range. If there are a plurality of sample images with closely resembling characteristic quantity data, a sample image whose characteristic quantity data have been calculated earliest may be omitted. Or, a sample image, whose characteristic quantity data more closely resembles the characteristic quantity data of the original image than other sample images, may be selected for the index. Or, sample images, whose characteristic quantity data have been calculated later than the other sample images, may be omitted. In other words, sample images to be omitted may be set in order of generations of the characteristic quantity data.

As an example, it will be assumed that there exist sample images D and E having the following percentages of coverage for each hue-region and having the following representative values for each hue-region.

Percentage of sample image D occupied by the R hue-region: sRateR_D=25%
Percentage of sample image D occupied by the G hue-region: sRateG_D=15%
Percentage of sample image D occupied by the B hue-region: sRateB_D=30%
Percentage of sample image D occupied by the C hue-region: sRateC_D=10%
Percentage of sample image D occupied by the M hue-region: sRateN_D=8%
Percentage of sample image D occupied by the Y hue-region: sRateY_D=12%
Representative values in the R hue-region of sample image D: (sHr, sSr, sVr)=(25, 0.3, 0.5)
Representative values in the G hue-region of sample image D: (sHg, sSg, sVg)=(120, 0.2, 0.7)
Representative values in the B hue-region of sample image D: (sHb, sSb, sVb)=(220, 0.4, 0.6)

Representative values in the C hue-region of sample image D:
(sHc, sSc, sVc)=(190, 0.3, 0.1)
Representative values in the M hue-region of sample image
D: (sHm, sSm, sVm)=(315, 0.9, 0.9)
Representative values in the Y hue-region of sample image D:
(sHy, aSy, sVy)=(70, 0.4, 0.3)
Percentage of sample image E occupied by the R hue-region:
sRateR_E=26%
Percentage of sample image E occupied by the G hue-region:
sRateG_E=16%
Percentage of sample image E occupied by the B hue-region:
sRateB_E=8%
Percentage of sample image E occupied by the C hue-region:
sRateC_E=10%
Percentage of sample image E occupied by the M hue-region:
sRateM_E=8%
Percentage of sample image E occupied by the Y hue-region:
saateY_E=12%
Representative values in the R hue-region of sample image E:
(sHr, sSr, sVr)=(25, 0.3, 0.55)
Representative values in the G hue-region of sample image E:
(sHg, sSg, sVg)=(120, 0.2, 0.7)
Representative values in the B hue-region of sample image E:
(sHb, sSb, sVb)=(220; 0.45, 0.6)
Representative values in the C hue-region of sample image E:
(sHc, sSc, sVc)=(190, 0.3, 0.15)
Representative values in the M hue-region of sample image E:
(sHm, sSm, sVm)=(320, 0.9, 0.9)
Representative values in the Y hue-region of sample image E:
(sHy, sSy, sVy)=(75, 0.4, 0.3)

In this example, it is determined that sample images D and E resemble each other and, therefore, either one of the sample images D and E is eliminated. In other words, sample images are determined to be similar when the coverage percentages of the hue-regions (six values) and the representative values for H, S, and V in the respective hue-regions (eighteen values) all resemble one another. It is also possible to determine that sample images resemble one another when, for the sample images, some of the plurality of values for percentages and representative values resemble one another. It is also possible to select at least one sample image when determining that three or more sample images are similar. For example, two sample images may be selected from among three similar sample images.

In the methods (A)-(D), the CPU 71 presents the sample images in an order that gives priority to those images that are more similar to the original image and therefore that have a higher probability of being selected by the user, thereby improving selection efficiency.

While four methods (A)-(D) of sorting are given above, the layout positions may be set according to any of other various methods.

In the first embodiment, the multifunction device 1 inputs an original image to be subjected to color correction from a memory card (S101) and determines the second characteristic quantity data representing the characteristics of the inputted original image (S103-S104) The multifunction device 1 also inputs a plurality of sample images from the image-reading unit 20 (S106-S109) and determines the first characteristic quantity data representing the characteristics of the sample images (S111, S112). The multifunction device 1 then generates corrected thumbnail images representing the results of color correction for the first characteristic quantity data of the sample images when color correction is performed on the original image so that the second characteristic quantity data approaches the first characteristic quantity data (S114). The multifunction device 1 prints the corrected thumbnail images generated above in an index format, in which the corrected thumbnail images are displayed in association with the thumbnail sample images used for generating the corrected thumbnail images (S116-S118).

With the multifunction device 1 having this configuration, the user can confirm results of a color correction process in advance by printing a list of corrected thumbnail images based on a plurality of prepared sample images and can therefore efficiently select a sample image from which the user's desired correction results have been obtained. Hence, the multifunction device 1 can perform color correction that accurately reflects the user's intention.

In the first embodiment, if the original image includes a building and sky, for example, and the user wishes to convert the blue color of the sky to a brilliant ocean bluer the multifunction device 1 can perform this conversion through an operation using the image reading unit 20 to scan a photograph of a brilliant ocean as the sample image.

Similarly, the multifunction device 1 according to the first embodiment can convert flesh tones in an original image of a person's profile to lighter tones through an operation using the image-reading unit 20 to scan a photograph showing the palm of a hand or the like with lighter flesh tones.

Hence, the user can perform desired image correction simply by scanning an image as a model for the image correction, and need not have any special knowledge of image processing since there is no need to input parameters and the like. Further, since the multifunction device 1 can automatically select hue-regions of an image to subject to correction, the multifunction device 1 can convert colors in only hue-regions that are easily perceived, while reducing or eliminating the conversion of less noticeable hue-regions.

The multifunction device 1 also generates a thumbnail original image from the inputted original image (S102) and generates corrected thumbnail images by performing the color correction process on the thumbnail original image (S114). Hence, this configuration makes the process for generating corrected thumbnail images simpler than when corrected thumbnail images are generated based on results of a color correction process performed directly on the original image.

When the user selects one of the corrected thumbnail images (S119), the multifunction device 1 performs a color correction process on the original image so that the representative values in the second characteristic quantity data approach those in the first characteristic quantity data used for generating the selected corrected thumbnail image (S120, S121) and subsequently prints the corrected original image (S122). Accordingly, the user can print the original image corrected according to the color correction process represented by the selected corrected thumbnail image simply by selecting the corrected thumbnail image, without having to reread or rescan the sample image and original image.

Further, since the multifunction device 1 prints the thumbnail sample images and corresponding corrected thumbnail images in order of the sample images having characteristics that closely resemble the characteristics of the original image (S116-S118), the user can more easily compare the plurality of corrected thumbnail images visually.

At the same time, the multifunction device 1 inputs images scanned in a plurality of scanning regions divided within the document-supporting surface as independent sample images. Accordingly, the multifunction device 1 can easily scan a plurality of sample images to reduce a processing time.

Moreover, the multifunction device 1 determines that no image exists in a scanning region when the mean brightness $V_{mean}$ of the image scanned in that scanning region is greater than or equal to a threshold value $V_{Thre}$, thereby preventing areas in which no image exists from being inputted as a sample image.

Figure 10:
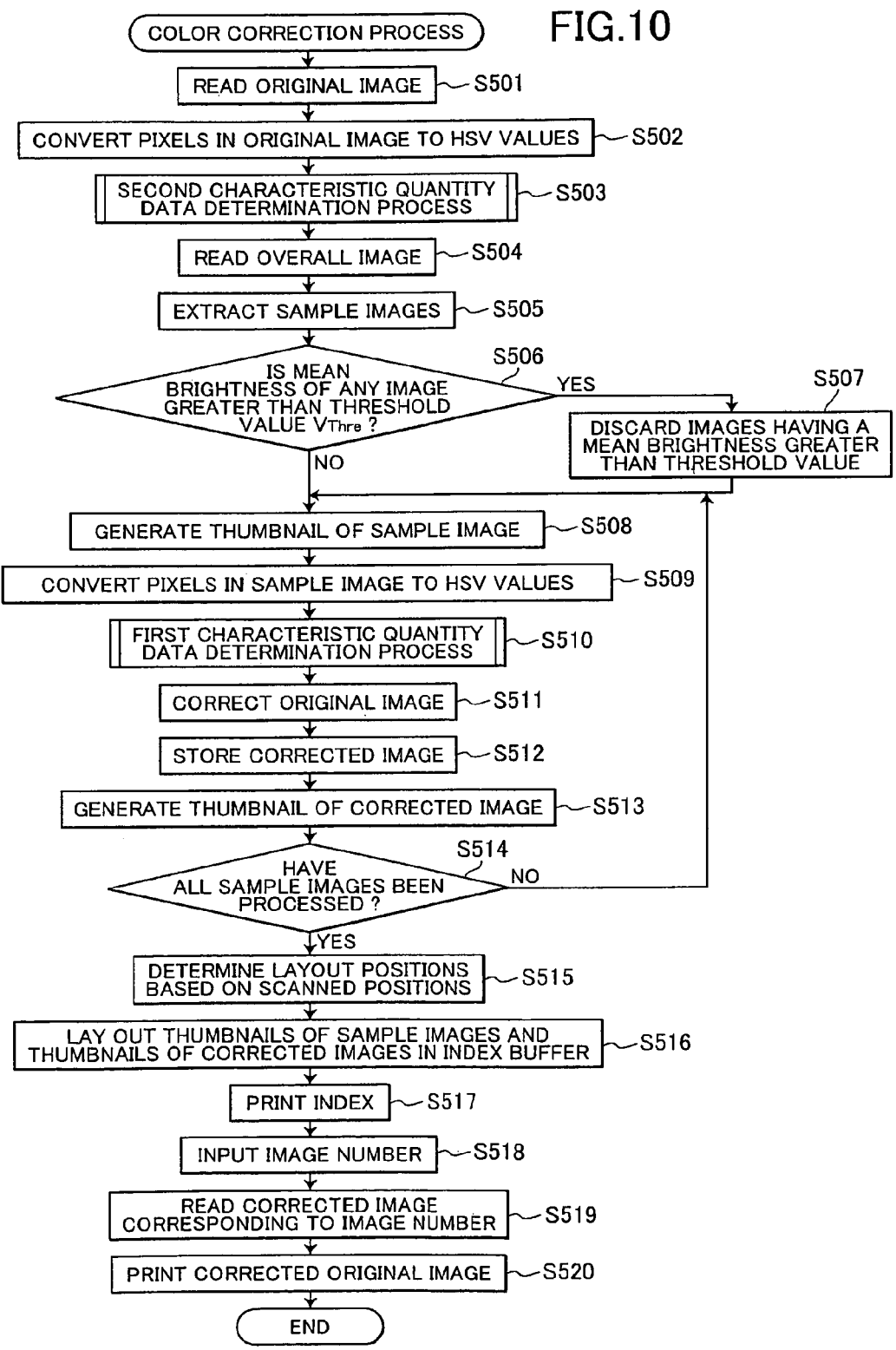
FIG. 10 is a flowchart illustrating steps in the color conversion process according to a first modification of the first embodiment.

Next, the multifunction device 1 according to a first modification of the first embodiment will be described. The multifunction device 1 according to the first modification differs from the multifunction device 1 in the first embodiment described above in that a color correction process illustrated in the flowchart of FIG. 10 is performed in place of the color correction process described above with reference to FIG. 4. The remaining configuration of the multifunction device 1 is identical to that in the first embodiment and will not be described here.

The color correction process in FIG. 10 differs from that in FIG. 4 according to the following points (1) and (2).

(1) While the multifunction device 1 generates corrected thumbnail images in the color correction process of FIG. 4 by performing color correction on the thumbnail original image, in the color correction process of FIG. 10 the multifunction device 1 performs color correction directly on the original image to generate actual corrected images. Specifically, the multifunction device 1 converts colors in the original image itself based on each sample image to generate a corrected original image for each sample image. Therefore, when the user selects an image number corresponding to one of the images printed in the index, the multifunction device 1 can print the corresponding corrected original image without having to repeat the image correction process.

(2) While the multifunction device 1 sets the layout positions of sample images based on their first characteristic quantity data in the color correction process of FIG. 4, in the process of FIG. 10 the multifunction device 1 sets the layout positions of the sample images based on the scanning regions in the document-supporting surface of the image-reading unit 20 from which the sample images have been read.

Specifically, the processes in S511 and S512 of the color correction process in FIG. 10 are performed in place of S102, S105, S113, and S121 in the color correction process of FIG. 4, and the processes in S513, S515, and S519 of FIG. 10 are performed in place of S114, S116, and S120 of FIG. 4. Details of the processes in S501-S510, S514, S516 S518, and S520 remain the same as the processes in S101, S103, S104, S106-S312, S115, S117-S119, and S122. Accordingly, the following description will focus on the differing processes.

In S511 the CPU 71 corrects the original image read in S501 based on the first characteristic quantity data determined in S510, the first characteristic quantity data of the sample image being processed, and the second characteristic quantity data determined in S503. This process is identical to the process of S114 except for using the original image in S511 rather than thumbnail original images in S114.

In S512 the CPU 71 stores data of the original image corrected in S511 (corrected original image) in a storage area of the RAM 73 in association with identification data for the sample image used in the process. If a corrected original image for a different sample image is already stored in the storage area at this time, the CPU 71 maintains the saved state of this corrected original image and adds the new corrected image. Hence, by repeating the process in S508-S513, the CPU 71 stores a plurality of corrected images for a plurality of sample images in the RAM 73. Here, the storing unit is not limited to the RAM 73, but may be a hard disk, for examples if the multifunction device 1 is provided with a hard disk.

In S513 the CPU 71 generates a thumbnail image of the corrected image (corrected thumbnail image). In other words, the CPU 71 performs a size conversion process (reducing process) to reduce the corrected image to a preset size for a thumbnail image.

In S515 the CPU 71 determines the layout positions of the thumbnail images for printing an index based on the scanning positions of the corresponding sample images. The CPU 71 determines the image number indicative of the layout position of each sample image. Specifically, each of the scanning regions in the document-supporting surface may be associated with a layout position for a sample image in advance. Using the example of FIGS. 5A-5C, the CPU 71 would layout the thumbnail images in the order Image1, Image2, Image3, and Image4 based on their corresponding scanning regions.

In S519 the CPU 71 reads the corrected image that has been corrected based on the sample image corresponding to the image number inputted in S518 (the corrected image stored in association with the identification number of this sample image) from the storage area in the RAM 73. After printing this corrected image using the image-printing unit 40 in S520, the CPU 71 ends the current color correction process.

As described above, the multifunction device 1 according to this modification generates corrected thumbnail images based on the results of performing color correction on the original image itself (S511, S513). Hence, the multifunction device 1 can generate corrected thumbnail images that accurately represent the results of the color correction process. Further, when the user selects one of the corrected thumbnail images (S518), the multifunction device 1 can print the corrected image directly without having to perform image correction a second time (S519, S520).

Further, since the multifunction device 1 determines the layout positions of thumbnail images when printing an index of thumbnail images based on the scanned positions of the corresponding sample images, the thumbnail images can be arranged according to the user's intention.

Figure 11:
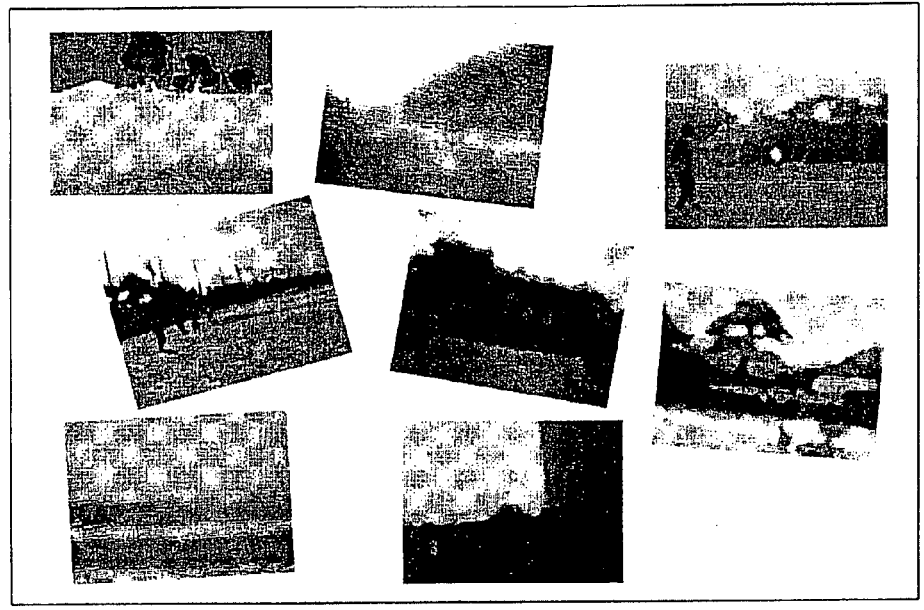
FIG. 11 is an explanatory diagram showing a document-supporting surface of the multifunction device when a plurality of documents are placed on the document-supporting surface.

In the first modification, the multifunction device 1 generates corrected thumbnail images (S513), while the multifunction device 1 may not generate the corrected thumbnail images. In this case, in S517 the multifunction device 1 may print corrected images in an index, in which the corrected images are displayed in association with the sample images used for generating the corrected images Other Modifications of the First Embodiment (1) The first embodiment describe a case in which the multifunction device 1 inputs images scanned from a plurality of scanning regions divided within the document-supporting surface as independent sample images, but the present invention is not limited to this configuration. For example, the multifunction device 1 may scan the entire document-supporting surface as a single image and subsequently extract individual images by analyzing the content of the overall image. With this configuration, the multifunction device 1 can extract a plurality of images arranged with no specific organization on the document-supporting surface, as shown in FIG. 11, as independent images. The plurality of images may be extracted from the overall image according to one of the following methods (a) and (b), for example.

(a) A method of recognizing, as single images on the scanned document-supporting surface, areas where at least a fixed number of pixels are gathered next to one another and have values determined to be non-white based on a threshold value set according to a white color in areas that an original document does not exist.

(b) A method of recognizing image regions within specific areas of the document-supporting surface and determining that an image exists in each of these specific areas when there exists in the corresponding specific area at least a fixed number of pixels having values determined to be non-white based on the same threshold value in (a) described above.

(2) While a plurality of sample images is read at once in the example of the first embodiment, the multifunction device 1 may repeatedly perform an operation to read sample images, acquiring one sample image at a time. This method can reliably prevent a single image from being misinterpreted as a plurality of images or, conversely, a plurality of images as a single image.

(3) While the multifunction device 1 scans sample images with the image-reading unit 20 as in the first embodiment, the multifunction device 1 may set images read from a memory card or images received from an external source via the communication section 60 as the sample images.

(4) While the original image to undergo color correction are inputted from a memory card in the first embodiment and the first modification, the original image may be scanned by the image-reading unit 20 or received from an external source via the communication section 60.

(5) In the color correction process of the first embodiment, a process is performed to convert pixels in the sample image and original image to HSV parameters prior to the process for determining the first and second characteristic quantity data. However, pixels may be converted to other parameters than HSV parameters, such as L*c*h* parameters or RGB parameters.

(6) In the first embodiment, the first characteristic quantity data is determined after determining the second characteristic quantity data in the color correction process, but the second characteristic quantity data may be determined after determining the first characteristic quantity data.

(7) In the first embodiment, the algorithm for determining the first characteristic quantity data is identical to the algorithm for determining the second characteristic quantity data, but different algorithms may be used.

(8) While the multifunction device 1 prints corrected thumbnail images in the first embodiment, the multifunction device 1 may display these images on the display section 32 or on a display of a personal computer capable of communicating with the multifunction device 1, rather than printing the corrected thumbnail images. However, printing the corrected thumbnail images in the first embodiment is more effective than displaying these images on the display section 32 in that the user can more accurately determine color tones of the corrected images when the corrected images are actually printed.

(9) In the first embodiment data stored in the storage area of the RAM 73 is preserved until the current color correction process ends, but it is also possible to preserve this data semi-permanently until the user performs an operation to delete the data, for example.

(10) While natural numbers are used as an example of the image numbers in the first embodiment, the image numbers may be configured of characters, symbols, or the like, provided that these image numbers can identify individual images from among a plurality of images. It is also possible to identify a desired image based on the layout positions of the images (the ordered position from top to bottom) without printing the image numbers.

(11) In the first embodiment and first modification, a color correction process is used as an example of the image correction process, but an image correction process other than that described in the first embodiment may be performed.

(12) In the first embodiment, the multifunction device 1 performs image correction on all six hue-regions divided according to hue values, but the multifunction device 1 need not perform image correction on regions occupying a small percentage of the image (or may perform fewer corrections in these regions), for example. Next, in a second modification of the first embodiment, the color correction process of FIG. 4 includes a representative value resetting process that is performed prior to each of the image correction processes of S114 and S121. The representative value resetting process is a process for resetting representative values based on a condition of the first characteristic quantity data and second characteristic quantity data used in the image correction process of S114 and S121. Similarly, in the second modification of the first embodiment, the color correction process of FIG. 10 includes a representative value resetting process that is performed prior to each of the image correction process of S511. The representative value resetting process is a process for resetting representative values based on a condition of the first characteristic quantity data and second characteristic quantity data used in the image correction process of S511.

Figure 12:
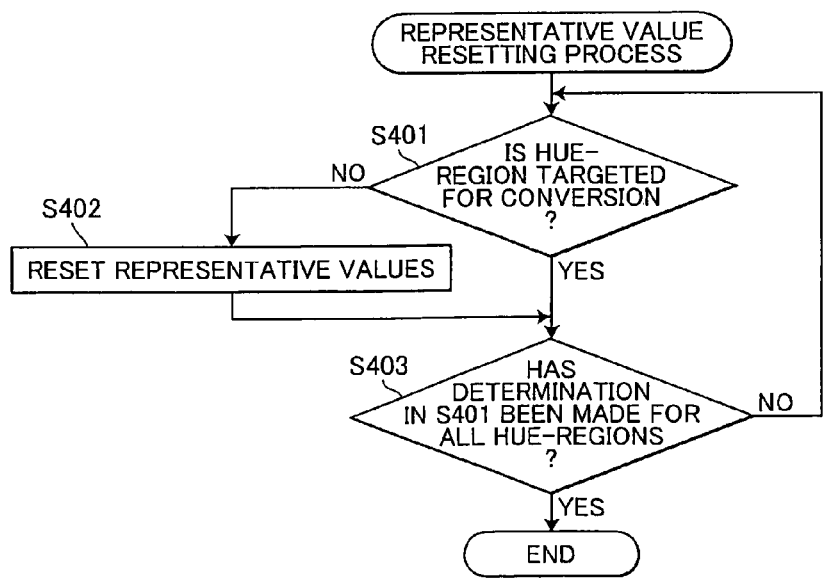
FIG. 12 is a flowchart illustrating steps in a representative value resetting process according to a second modification of the first embodiment.

FIG. 12 is a flowchart illustrating steps in the representative value resetting process. In S401 of this process, the CPU 71 determines whether one hue-region among the six hue-regions should be a target of conversion. The CPU 71 performs this determination by determining whether the subject hue-region meets a prescribed condition The CPU 71 advances to S402 when determining that the hue-region is not a target of conversion (S401: NO) and advances to S403 when determining that the hue-region is a target of conversion (S401: YES). In S402 the CPU 71 resets the representative values for the subject hue-region and subsequently advances to S403. More specifically, for the hue-region that is not a target of conversion, the CPU 71 resets the hue representative values in the first characteristic quantity data and in the second characteristic quantity data to be equal to each other, resets the saturation representative values in the first characteristic quantity data and in the second characteristic quantity data to be equal to each other, and resets the brightness representative values in the first characteristic quantity data and in the second characteristic quantity data to be equal to each other For example, the CPU 71 resets the hue representative values to the middle value of the subject hue-region, resets the saturation representative values to the middle value (0.5) in the range of saturation (0 to 1), and resets the brightness representative values to the middle value (0.5) in the range of brightness (0 to 1).

In S403 the CPU 71 determines whether the process in S401 for determining whether a hue-region is to be converted has been performed for all hue-regions (six hue-regions in the example). If there remain any hue-regions for which the determination of S401 has not yet been performed (S403: NO), the CPU 71 returns to S401. When a determination has been performed on all hue-regions (S403: YES), the CPU 71 ends the representative value resetting process. Examples of the method of the judgment in S901 includes; (A) a method of using a threshold thre; and (B) a method of using data of a hue-region having the largest area.

(A) Method Using a Threshold Thre

The prescribed condition used in the judgment of S401 described above is a relationship between the size of the hue-region in question and a threshold Thre. When the percentage of the original image or sample image occupied by the subject hue-region is less than the threshold Thre (S401: YES), the CPU 71 changes in S402 the representative values in the first characteristic quantity data of the original image and the representative values in the second characteristic quantity data of the sample image related to this hue-region to the same values, so that conversion will be executed by using the new representative values. The representative values can be changed or reset in the following way:

When sRateR<Thre or iRateR<Thre, sHr=0, sSr=0.5, sVr=0.5, iHr=0, iSr=0.5, iVr=0.5.

When sRateG<Thre or iRateG<Thre, sHg=120, sSg=0.5, sVg=0.5, iHg=120, iSg=0.5, iVg=0.5.

When sRateB<Thre or iRateB<Thre, sHb=240, sSb=0.5, sVb=0.5, iHb=240, iSb=0.5, iVb=0.5.

When sRateC<Thre or iRateC<Thre, sHc=180, sSc=0.5, sVc=0.5, iHc=180, iSc=0.5, iVc=0.5.

When sRateM<Thre or iRateM<Thre, sHm=300, sSm=0.5, sVm=0.5, iHm=300, iSm=0.5, iVm=0.5.

When sRateY<Thre or iRateY<Thre, sHy=60, sSy=0.5, sVy=0.5, iHy=60, iSy=0.5, iVy=0.5.

The above example employs the middle value 0.5 of possible values (0-1) for the S value and V value, and also employs the middle value of the corresponding hue-region for the H value. However, the representative values described above are merely an example, and the present invention is not limited to these values.

When converting a pixel using the equations described above (Equations 2-5), the S and V values of the pixel do not change using the representative values described above. For example, when $S \leq iSr$ for the R hue-region, S' is calculated according to equation 2 as follows.

$$S' = S \times (sSr \div iSr)$$

However, since sSr=0.5 and iSr=0.5 in this equation, the equation becomes:

$$S' = S \times (0.5 \div 0.5) = S \quad \text{(Equation 6)}$$

Similarly, S'=S when S>iSr.

The V values in this hue-region are not changed, either. The S and V values in other hue-regions are also not changed in the same manner as described above for R hue-region.

Further, by resetting the representative values for some hue-region in a manner described above, it is possible to reduce the amount of hue conversion in the hue-region. In other words, the amount of hue conversion can be reduced by modifying the representative values for the hue, even when using the conversion equation described above (Equation 1).

Next, a method of determining the threshold Thre will be described. This value Thre can be set based on a sensory evaluation (visual impression). In sensory evaluations, the inventors have confirmed that any hue-region is likely to be perceived when the hue-region occupies more than about 6% of the entire image area, Hence, the threshold Thre can be set to 6%. However, the present invention is not limited to a threshold Thre of 6%.

It is also possible to set the threshold Thre to such a value that can extract hue-regions having a large area relative to other hue-regions. For example, because the image is divided into six hue-regions, the threshold Thre can be set to the inverse value, or 1/6 of the total number of the hue-regions.

The number "six" given as an example of the number of hue-regions is identical to a number that is obtained by subtracting the number of the achromatic colors white and black from the number of vertices (eight that is possessed by an RGB color space, which is one of color gamuts expressing colors). The human eyes can differentiate colors sufficiently when the hues are divided into six hue-regions. If the number of the hue regions is set less than six, there is a possibility that the user may not feel that the original image is modified based on the sample image. Dividing the image into more than six hue-regions will increase the conversion accuracy. However, it is likely that the user will not be able to distinguish the differences in color. Further, the number of calculations increases when the number of divisions increases. When using a printer, such an increase in computations increases the time required to obtain the calibrated image as the printing results, potentially leading to more frustration for the user. Therefore, it is considered that six is a preferable number of divisions.

While the same threshold is used for all hue-regions in the above example, a different threshold Thre may be used for each hue-region.

(B) Method Using Data of a Hue-Region Having the Largest Area

In the above method (A), a threshold Thre is set and representative values are modified based on this threshold Thre, thereby performing control to suspend the image correction process in some hue-regions and to reduce the amount of conversions. Contrarily, the method (B) enables the image correction process to use data of a hue-region having the largest area in the image in order to incorporate only specific colors of the sample image in the original image.

In this method, the prescribed condition in the determination of S401 in FIG. 12 is whether a hue-region having the largest area in the original image is the same as a hue-region having the largest area in the sample image, and the hue-region in question is the hue-region having the largest area both in the original image and in the sample image. If the judgment is S401 is affirmative, the representative values for hue-regions other than the subject hue-region are reset according to the following equations, where iMaxRate is the percentage of the original image occupied by the largest-area hue-region in the original image, and sMaxRate is the percentage of the sample image occupied by the largest-area hue-region in the sample image.

When sRateR≠sMaxRate or iRateR≠iMaxRate, sHr=0, sSr=0.5, sV=0.5, iHr=0, iSr=0.5, iVr=0.5.

When sRateG≠sMaxRate or iRateG≠iMaxRate, sHg=120, sSg=0.5, sVg=0.5, iHg=120, iSg=0.5, iVg=0.5.

When sRateB≠sMaxRate or iRateB≠iMaxRate, sHb=240, sSb=0.5, sVb=0.5, iHb=240, iSb=0.5, iVb=0.5.

When sRateC≠sMaxRate or iRateC≠iMaxRate, sHc=180, sSc=0.5, sVc=0.5, iHc=180, iSc=0.5, iVc 0.5.

When sRateM≠sMaxRate or iRateM≠iMaxRate, sHm=300, sSm=0.5, sVm=0.5, iHm=300, iSm=0.5, iVm=0.5.

When sRateY≠sMaxRate or iRateY≠iMaxRate, sHy=60, sSy=0.5, sVy=0.5, iHy=60, iSy=0.5, iVy=0.5.

Through this process, only those pixels that are located in the hue-region that has the largest area both in the original image and in the sample image are converted. Accordingly, in the hue-regions other than the largest-area hue-region, S and V values are not converted, and the amount of conversions for H values is reduced.

Figure 13:
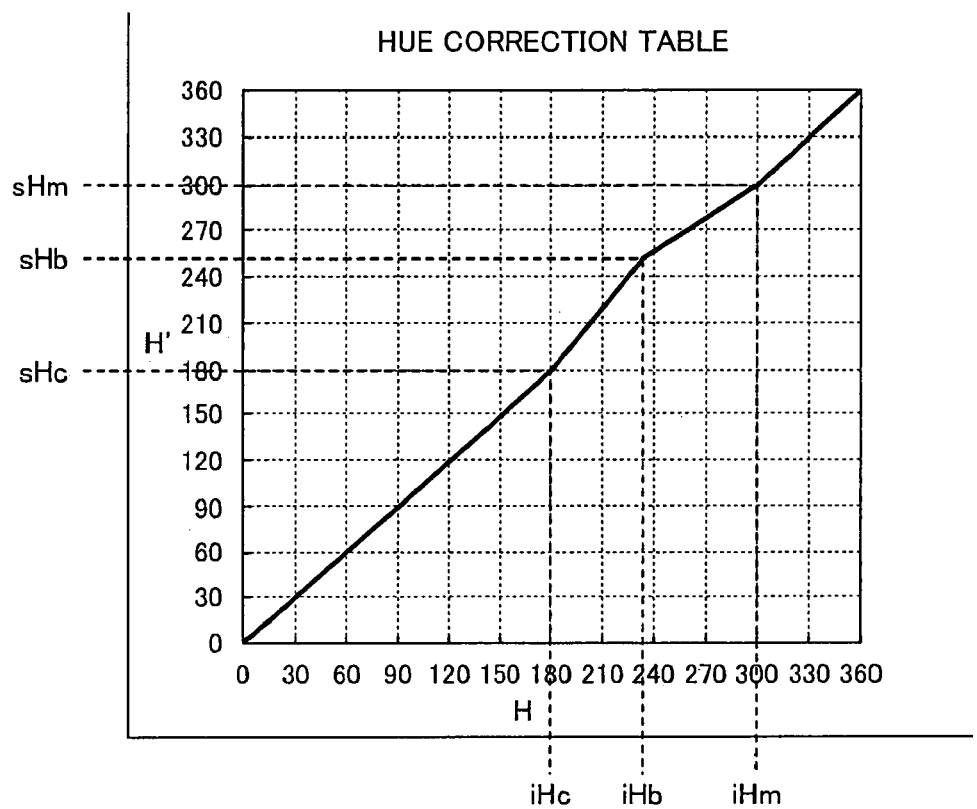
FIG. 13 is a graph for a hue correction table according to a third modification of the first embodiment.

For example, when the B hue-region occupies the largest area both in the original image and the sample image, the hue correction table of FIG. 9 is modified into a hue correction table, such as shown in the graph of FIG. 13. As shown in the graph of FIG. 13, the representative H values (iHc=180, sHc=180) in the C hue-region adjacent to the B hue-region in the color space and the representative H values (iHb, sHb) in the B hue-region are connected with each other by a straight line, and the representative H values (iHm=300, sHm=300) in the M hue-region adjacent to the B hue-region in the color space and the representative H values (iHb, sHb) in the B hue-region are connected with each other by another straight line.

Therefore, H values are converted in both the C hue-region, where 180<H≦210, and the M hue-region, where 270<H≦300. The amount of conversion increases in values closer to the B hue-region.

In the image correction process according to this modification, it is possible to select hue-regions where conversion is executed. Further, since a portion of the H values in hue-regions not targeted for conversion but adjacent to hue-regions targeted for conversion in the color space are converted, this method can prevent the occurrence of false contour (tone jump) between converted and non-converted hue-regions.

By performing this representative value resetting process, the multifunction device 1 can partially suspend the correction process for divided hue-regions based on the size of the hue-regions and can reduce the amount of conversions. Accordingly, the user is able to reflect only part of the color tones from the sample image in the color tones of the original image.

(13) In the second modification, a color correction process is used as an example of the image correction process, but an image correction process other than that described in the second modification may be performed.

While the amount of conversion for H values in the hue-regions not targeted for conversion can be reduced in the image correction process of the second modification, the conversion may not be completely eliminated. This is because the H values in hue-regions not targeted for conversion are affected by the representative values in hues regions targeted for conversion, since linear interpolation is performed using representative values of hue-regions not targeted for conversion, as illustrated in FIG. 13.

Figure 14:
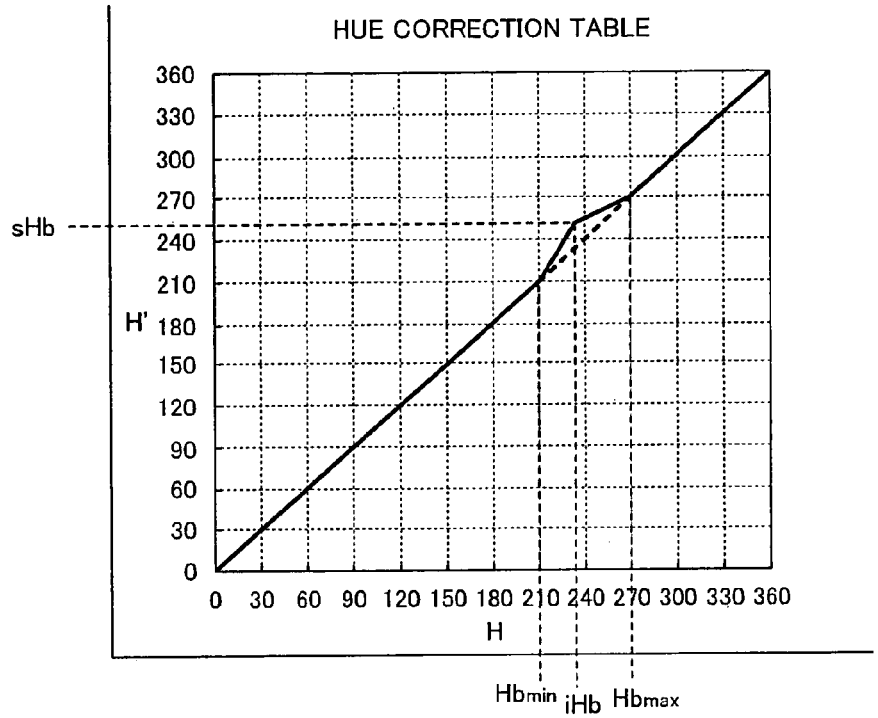
FIG. 14 is a graph for a hue correction table according to a fourth modification of the first embodiment.

According to a third modification of the first embodiment, the hue correction table of FIG. 13 is further modified as shown in the graph in FIG. 14. FIG. 14 shows the hue correction table targeting only the B hue-region for conversion. While only one hue-region is targeted for conversion in FIG. 14, it is also possible to target a plurality of hue-regions.

In FIG. 14, H'=H for values outside the B hue-region, and thus image correction is not performed in these hue-regions. The value of H' in the B hue-region can be found with the following equation, where $Hb_{min}$ is the smallest value of H (210) in the B hue-region and $Hb_{max}$ is the largest value in the B hue-region (270).

When H≦iHb, $H'=Hb\text{min}+(sHb-Hb\text{min})\times(H-Hb\text{min})\div(iHb-Hb\text{min}).$ When H>iHb, $H'=sHb+(Hb\text{max}-sHb)\times(H-iHb)\div(Hb\text{max}-iHb).$ Hence, the above equations can be used to convert pixels in only the targeted hue-region. By converting H values only in the hue-region targeted for conversion, the effects of image correction can be enhanced.

Figure 15:
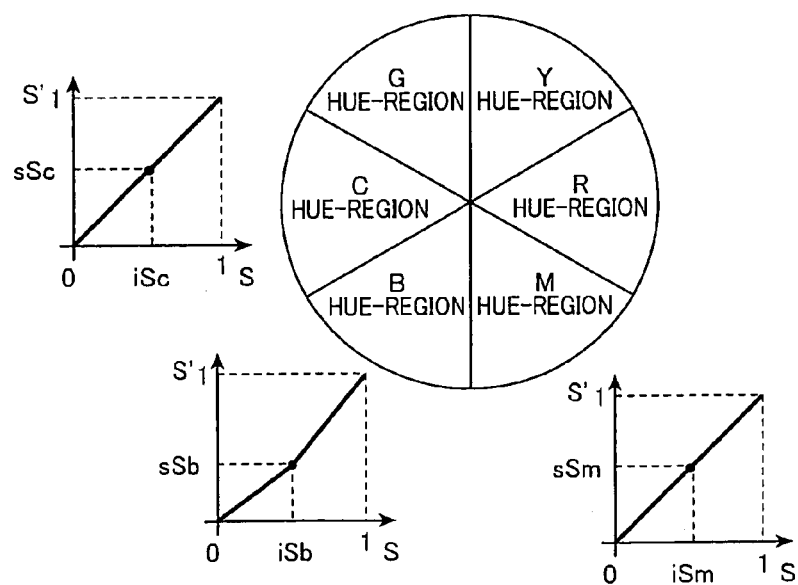
FIG. 15 shows graphs for three color hue-regions illustrating saturation correction tables.

(14) In the first embodiment and modifications, the S value correction curves for the respective hue-regions (conversion equation 2 or 3) are independent from one another. So, there is a danger of generating false contour (tone jump). More specifically, a table indicating the relationship between S and S' is provided for each hue-region, as shown in FIG. 15, without consideration for the properties of tables for adjacent hue-regions. Similarly, the V value correction curves (conversion equation 4 or 5) for the respective hue-regions are also independent from one another.

In a fourth modification of the first embodiment, tone jump can be prevented by modifying the correction curves in the respective hue-regions so that the correction curves will smoothly change through the hue-regions as shown in FIG. 16.

According to the fourth modification, the image correction process for correcting the hue value and the S value of a pixel is executed while modifying the correction curves. This image correction process will be described next in detail with reference to FIGS. 17 and 18. Following explanation is for the case where the hue value of a pixel targeted for conversion falls in the B hue-region and is nearer to the C hue-region than to the N hue-region. However, the process is essentially the same for other cases.

The value S of the pixel targeted for conversion is converted into a modified, converted value S" according to equation 7 below using the following parameters.

H: The hue value for the pixel (see FIGS. 17 and 18)
S: The saturation value for the pixel (see FIG. 17)
$Hb_{mid}$: The middle hue value (240) in a target hue-region (D hue-region in this example), where the hue value H of the pixel falls
$Hc_{mid}$: The middle hue value (180) in another hue-region (C hue-region, in this example) that is adjacent to the target hue-region on a side near the hue coordinate position of the hue value H of the pixel (see FIGS. 17 and 18)
Sb': A B-region-dependent converted saturation value for the pixel, which is calculated by using the above-described equation 2 or 3 (the saturation correction table) for the B hue-region based on the saturation value S of the pixel as shown in FIG. 17 (see FIG. 17)
Sc': A C-region-dependent converted saturation value for the pixel, which is calculated by using the above-described equation 2 or 3 (the saturation correction table) for the C hue-region based on the saturation value S of the pixel as shown in FIG. 17 (see FIG. 17)

$$S''=\{(H-Hc_{mid})\times Sb'+(Hb_{mid}-H)\times Sc'\}\div(Hb_{mid}-Hc_{mid})\} \quad \text{(Equation 7)}$$

The value V of the pixel targeted for conversion is converted into a modified, converted value V" according to equation 8 below using the following parameters.

H: The hue value for the pixel (see FIGS. 17 and 18)

V: The brightness value for the pixel $Hb_{mid}$: The middle hue value (240) in a target hue-region (B hue-region in this example), where the hue value H of the pixel falls $Hc_{mid}$: The middle hue value (180) in another hue-region (C hue-region, in this example) that is adjacent to the target hue-region on a side near the hue coordinate position of the hue value H of the pixel (see FIGS. 17 and 18)

Vb': A B-region-dependent converted brightness value for the pixel, which is calculated by using the above-described equation 4 or 5 (the brightness correction table) for the B hue-region based on the brightness value V of the pixel Vc': A C-region-dependent converted brightness value for the pixel, which is calculated by using the above-described equation 4 or 5 (the brightness correction table) for the C hue-region based on the brightness value V of the pixel $$V'' = ((H - Hc_{mid}) \times Vb' + (Hb_{mid} - H) \times Vc') \div \{(Hb_{mid} - Hc_{mid})\} \quad \text{(Equation 8)}$$

Figure 18:
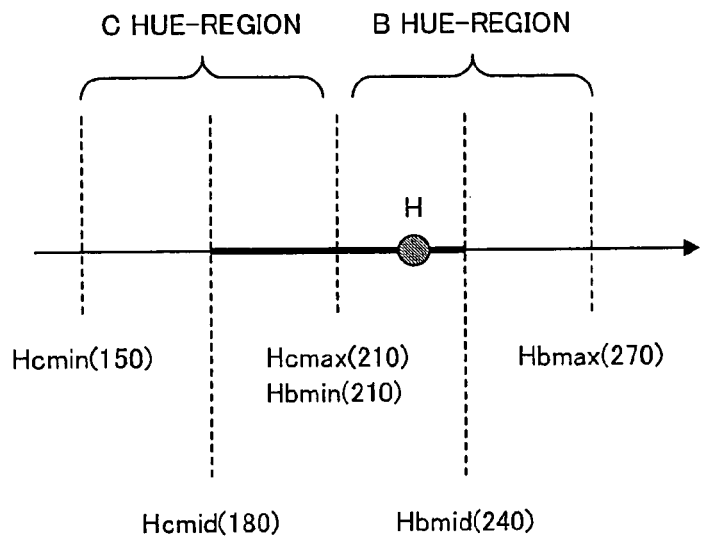
FIG. 18 is an explanatory diagram showing parts of the B hue-region and C hue-region targeted for conversion.

The above process is performed when the hue value H of the pixel in question is in the range of $Hc_{mid}$ (180) to $Hb_{mid}$ (240) as shown in FIGS. 17 and 18. By finding the output saturation value (S") and lightness value (V") through the above calculations weighted according to the input hue value H, it is possible to produce smooth correction effects between hues.

The image processing device of the present embodiment may be modified to suitably combine the image correction processes described above. For example, it is possible to perform a process that emphasizes image correction for H values while preventing tone jump in S and V values.

(15) Further, while the first embodiment describes a multifunction device 1 as the image processor, a data processor such as a personal computer may be used to perform image correction.

Figure 20:
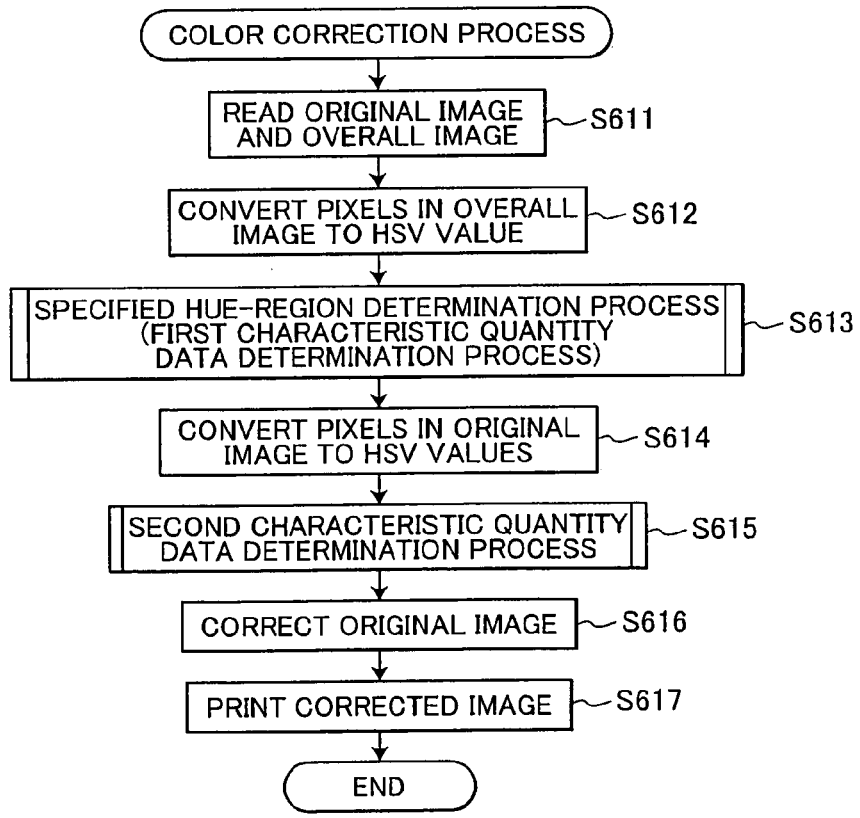
FIG. 20 is a flowchart illustrating steps in the color conversion process according to the second embodiment.

Next, an image multifunction device 10 according to a second embodiment will be described. The multifunction device 10 according to the second embodiment differs from the multifunction device 1 in the first embodiment described above in that an image correction process illustrated by the flowchart in FIGS. 19 and 20 is performed in place of the color correction process described above with reference to FIGS. 3 and 4. The remaining configuration of the multifunction device 10 is identical to that of the multifunction device 1 in the first embodiment and will not be described here.

FIG. 19 is a flowchart illustrating steps in the image correction process according to the second embodiment. As shown in FIG. 19, the user first inserts a memory card in the card slot 50 of the multifunction device 10 (step 21). After the user has inserted the memory card into the card slot 50, the multifunction device 10 recognizes this memory card and prompts the user to select an image to be corrected from among the images stored in this memory (step 22).

After the user has specified an original image (step 23), the multifunction device 10 reads the original image from memory and writes the image data to the RAM 73 (step 24).

Next, the user places a document on a document-supporting surface of the image reading unit 20 and presses a prescribed button (step 25). In response thereto, the image reading unit 20 scans the document and reads an entire image of the document (referred to as an "overall image" hereinafter). The multifunction device 10 writes the overall image to the RAM 73, for example (step 26).

By processing the overall image, the image multifunction device 10 sets a hue-region to be used as a sample for correcting the original image (hereinafter referred to as a "specified hue-region"; step 27). Details of the process performed on the overall image will be described later.

Next, the image multifunction device 10 divides the overall image into a plurality of images, extracts characteristic quantity data for each divisional image, and presents to the user information corresponding to the determined characteristic quantity data (step 28). This process will be described later in greater detail.

At this time, the user selects desired information from among the presented information (step 29). This process will be described later in greater detail.

Next, the image multifunction device 10 corrects the original image using the characteristic quantity data corresponding to the information selected by the user (step 30). In addition, the image multifunction device 10 may also be configured to print the corrected original image. This process will be described later in greater detail.

Next, a detailed description of the image correction process executed on the multifunction device 10 will be given.

FIG. 20 is a flowchart illustrating steps in the color correction process executed by the CPU 71 of the multifunction device 10. In S611 at the beginning of this color correction process, the CPU 71 reads an original image and an overall image of the document to the RAM 73. In the second embodiment, the format for the read image data is the RGB format, but may be another format.

In S612, the CPU 71 performs a process to convert each pixel in the original image and in the overall image read in S611 to HSV parameters in the same manner as S103 of FIG. 4.

Figure 21:
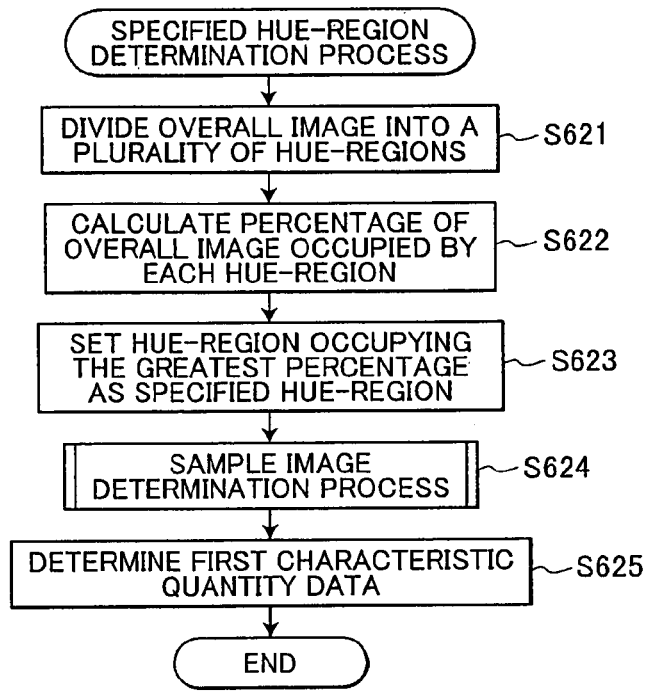
FIG. 21 is a flowchart illustrating steps in a specified hue-region determination process.

In S613 the CPU 71 sets a specified hue-region based on the overall image. The specified hue-region determination process for determining the specified hue-region will be described with reference to FIG. 21. FIG. 21 is a flowchart illustrating steps in the specified hue-region determination process.

In S621 of the specified hue-region determination process, the CPU 71 divides the overall image into a plurality of hue-regions (six commonly used hue regions in this example), in the same manner as S301 of FIG. 8. In S622 the CPU 71 calculates a percentage of the overall image that each hue-region occupies in the same manner as S302 of FIG. 8.

The percentage that each hue-region occupies in the overall image is defined as follows;

Percentage that the R hue-region occupies in the overall image; aRateR

Percentage that the G hue-region occupies in the overall image: aRateG

Percentage that the B hue-region occupies in the overall image: aRateB

Percentage that the C hue-region occupies in the overall image: aRateC

Percentage that the M hue-region occupies in the overall image: aRateM

Percentage that the Y hue-region occupies in the overall image; aRateY

The percentage for the R hue-region, for example, may be defined as aRateR=(number of pixels in the R hue-region of the overall image)÷(total number of pixels in the overall image), or may be defined according to another equation.

In S623 the CPU 71 determines a hue-region that has the largest percentage (hereinafter referred to as the "sample candidate hue-region") and sets this hue-region as a specified hue-region.

Figure 22:
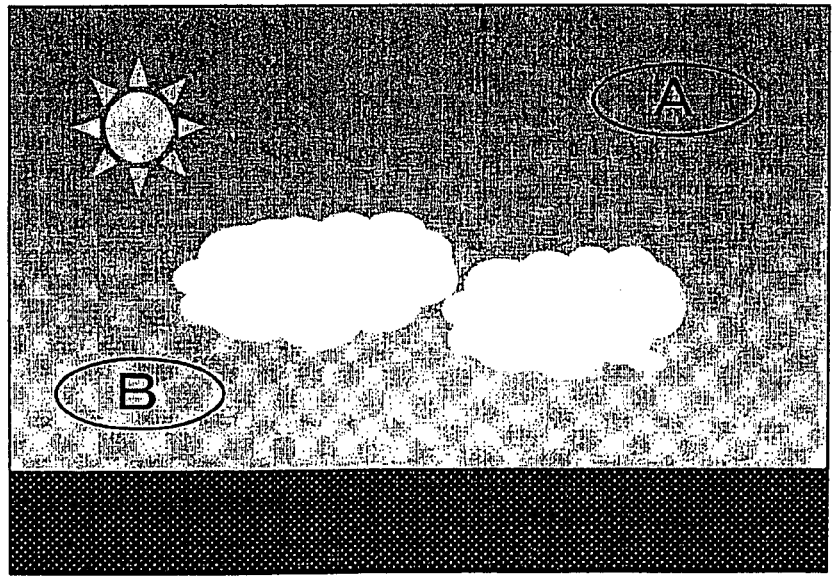
FIG. 22 is an explanatory diagram showing an overall image scanned from a document-supporting surface of the multifunction device.

In S624 the CPU 71 performs a sample image setting process to determine which area of the overall image should be set to an area (sample image), based on which characteristic quantity data is determined. For example, when the image shown in FIG. 22 is acquired as the overall image, the CPU 71 sets B hue-region as the sample candidate hue-region since the area of this sky portion, which is almost configured from pixels having B hue-region, is the largest in the overall image. However, while the encircled areas 1 and 2 in FIG. 22 may both be blue in color (B hue-region), brightness and saturation values of the area A are different from those of the area B. Accordingly, when the entire sky portion is set as the sample image, the dark portion and light portion of the sky (the area A and area B, in this example) are averaged, even when the user is interested in the dark sky portion (the area A). Hence, the present embodiment further narrows down the area to be used as the sample image in the overall image.

Figure 23:
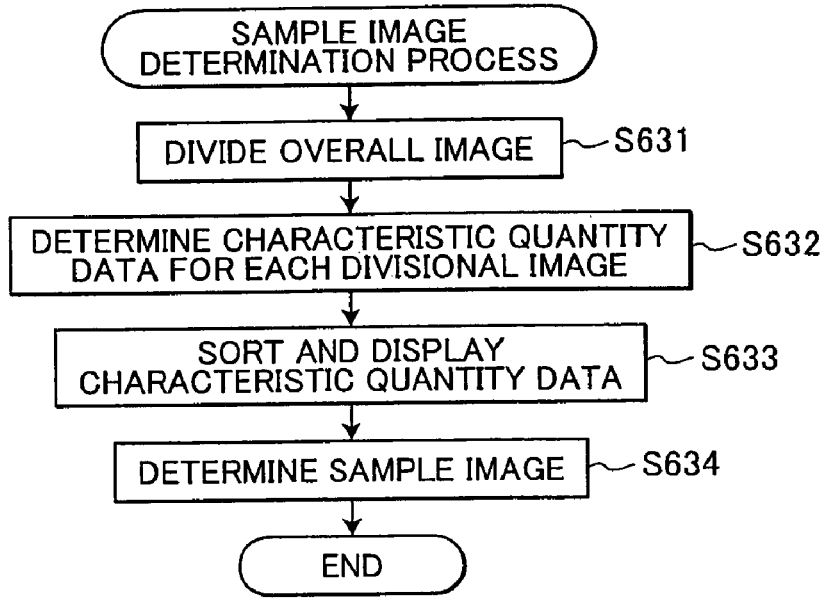
FIG. 23 is a flowchart illustrating steps in a sample image determination process.

FIG. 23 is a flowchart illustrating steps in the sample image setting process of S624.

Figure 24:
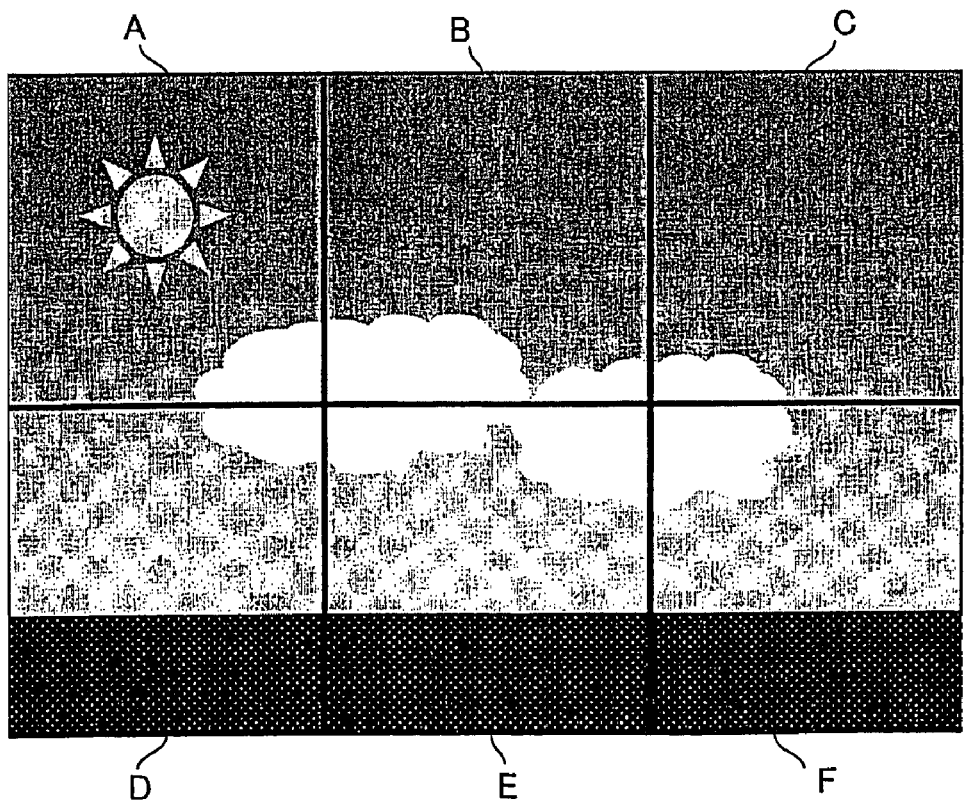
FIG. 24 is an explanatory diagram showing the overall image divided into a plurality of divisional image.

First, in S631 the CPU 71 divides the document overall image into a plurality of divisional images as shown in FIG. 24 (six divisional images A-F in the example, but the overall image may be divided into four or eight images.)

In S632 the CPU 71 determines characteristic quantity data in the specified hue-region for each divisional image in the same manner as S104 of FIG. 4. The determined characteristic quantity data may be representative S and V values in the specified hue-region or other characteristic quantity data. When the characteristic is quantity data is set to representative S and V values, two sets of representative values S and V are determined for each divisional image.

Figure 26A:
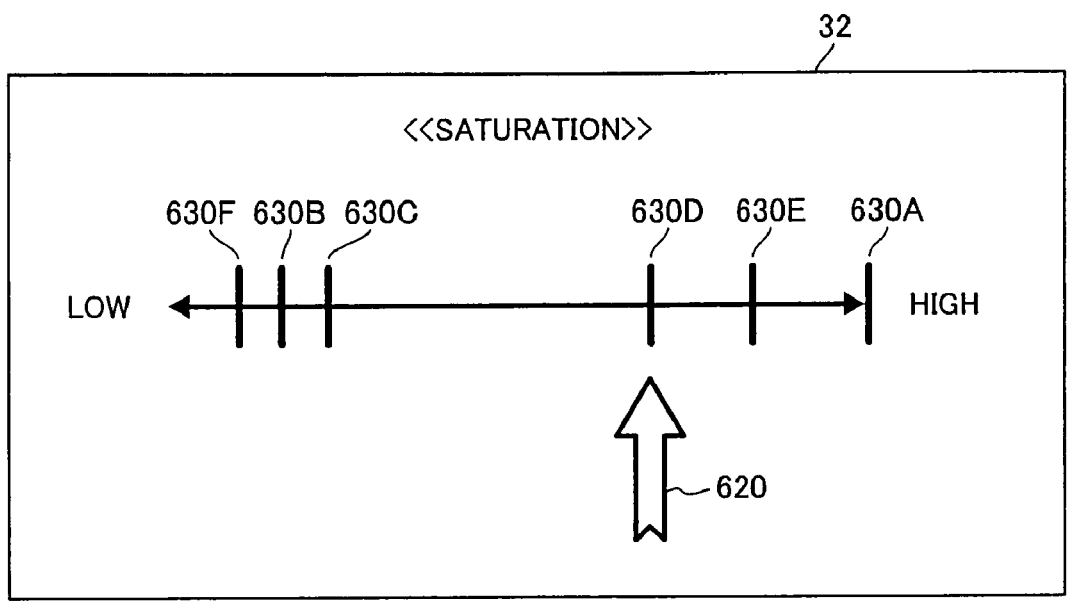
FIG. 26A is an explanatory diagram showing another example of screen shots, which includes the coordinates of scale, marks corresponding to representative saturation values, displayed on the display section.

In S633 the CPU 71 sorts and displays characteristic quantity data determined from the divisional images in S632. FIGS. 25A and 25B show sample screen shots displayed on the display section 32. In FIG. 25A, the representative S values acquired above are displayed as saturation. In FIG. 25A, the coordinates of scale marks 630A-630F correspond to representative S values determined from the divisional images A-F, respectively. Hence, when the representative S values of divisional images are biased, the marks 630A-630F are also unevenly distributed, as shown in FIG. 26A.

At this time, the user can manipulate a cursor 620 displayed on the display section 32 using the control panel 30 and/or a touch panel to select a scale mark indicating a representative s value (characteristic quantity data). The image multifunction device 10 may also be configured to display numbers corresponding to each mark 630, enabling the user to directly input a desired number.

Figure 26B:
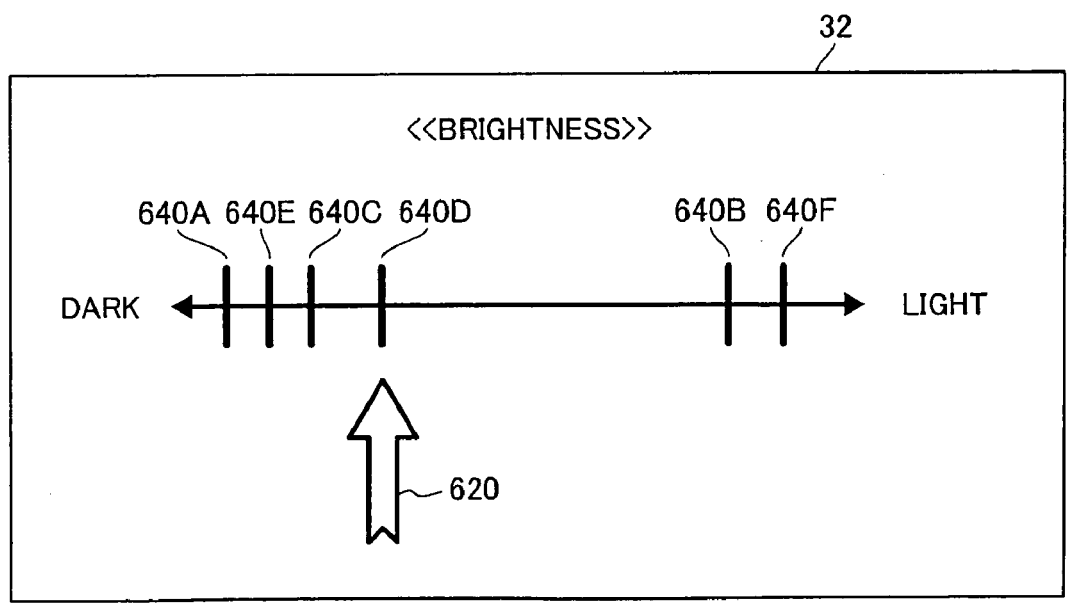
FIG. 26B is an explanatory diagram showing another example of screen shots, which includes the coordinates of scale marks correspond to representative brightness values, displayed on the display section.

Alternatively, the display section 32 may display representative V values as shown in FIG. 25B. In FIG. 25B, the coordinates of scale marks 640A-640F correspond to representative V values determined based on the divisional images A-F, respectively. Therefore, when the representative V values of divisional images are biased, the marks 640A-640F are also unevenly distributed, as shown in FIG. 26B. The user can manipulate the cursor 620 to select one scale mark indicating his/her desired representative V value. Also, the display section 32 may display both representative S values shown in FIG. 25A and representative V values shown in FIG. 25B.

In S634 the CPU 71 sets one divisional image that correspond to the characteristic quantity data selected in S633 as the sample image.

Returning to FIG. 21, in S625 the CPU 71 determines first characteristic quantity data from the sample image (divisional image) set in S624. Specifically, the CPU 71 determines representative H, S, and V values of the sample image set in S624 for the specified hue-region. The representative S and V values need not be recalculated at this time if the values acquired earlier in S632 of FIG. 23 are stored in the RAM 73.

Returning to FIG. 20, in S614 the CPU 71 converts pixels in the original image to HSV values. This process is identical to S612 described earlier, and a description of this process will not be repeated.

Figure 27:
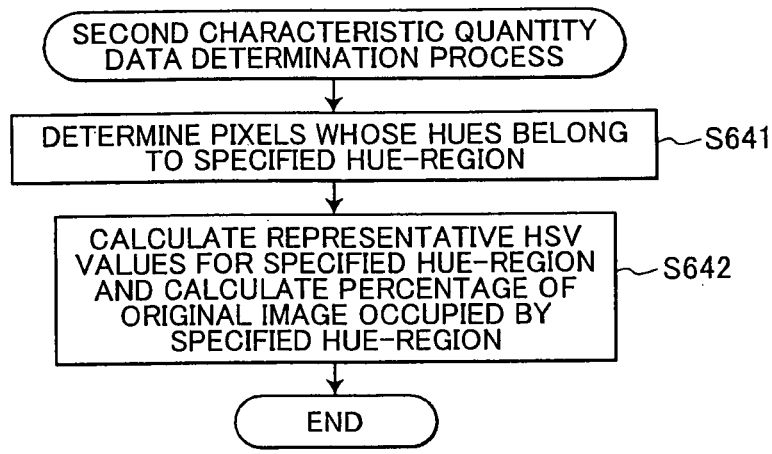
FIG. 27 is a flowchart illustrating steps in a second characteristic quantity data determination process according to the second embodiment.

Next in S615, a second characteristic quantity data determination process is executed. Next will be described the second characteristic quantity data determination process for determining the second characteristic quantity data with reference to FIG. 27. FIG. 27 is a flowchart illustrating steps in the second characteristic quantity data determination process.

In S641, the CPU 71 determines pixels, whose hue values belong to the specified hue-region in the original image, in the same manner as S201 of FIG. 7 (in the first embodiment).

In S642 the CPU 71 calculates the representative values for the specified hue-region in the original image and calculates the percentage of the original image occupied by the specified hue-region. The representative values are defined as follows when the specified hue-region is B hue-region (blue):
Representative values in the B hue-region: iHb, iSb, iVb The percentage of the original image occupied by the B hue-region is defined as follows:
Percentage of original image occupied by B region: iRateB Returning to FIG. 20, in S616 the CPU 71 corrects the original image based on the representative values for the specified hue-region in the first and second characteristic quantity data. This process is the same as the process of S121 shown in FIG. 4 (first embodiment), except that the CPU 71 creates the hue correction data by using only the representative H value for the specified hue-region. Specifically, the CPU 71 corrects the H, S, V values being of each pixel, whose H values is in the specified hue-region, by using the formulas 1-5 with the representative H, S, V values determined in S625 and S642. In other words, for the hue-regions other than the specified hue-region, the CPU 71 sets the hue representative values to the middle values of the corresponding hue-regions, sets the saturation representative values to the middle value (0.5) in the range of saturation (0 to 1), and sets the brightness representative values to the middle value (0.5) in the range of brightness (0 to 1). Accordingly, in S616 the CPU 71 creates the graph shown in FIG. 13 or FIG. 14 according to the third or fourth modification of the first embodiment, as the hue correction data. The CPU 71 creates the S or V correction data for the specified hue-region by using the representative S or V values for the specified hue-region.

According to the second embodiment, the user can perform a desired image correction process with great accuracy by determining a specified hue-region (a hue-region to be used as a model) in an overall image, and selecting a desired color tone within the specified hue-region. Further, through the color correction process described above, it is possible to convert color tones in the original image to color tones of the sample image for the specified hue-region.

According to the second embodiment, a color correction process conforming to the user's wishes can be implemented by enabling the user to select detailed parameters such as a dark or light color indirectly through intuitive operations.

In the above-described second embodiment, scale marks 630A-630F indicative of representative S values of all the divisional images A-F are displayed on the screen as shown in FIGS. 25A and 25B, and scale marks 640A-640F indicative of representative V values of all the divisional images A-F are displayed on the screen as shown in FIGS. 26A and 26B. However, scale marks for representative values of some divisional images, which have a percentage that the specified hue-region occupies in the subject divisional image less than or equal to a prescribed ratio, may not be displayed on the screen.

More specifically, according to this modification, in S632, the CPU 71 calculates, for each divisional image, not only the representative SV values for the specified hue-region, but also the percentage that the specified hue-region occupies in the subject divisional image. The CPU 71 compares the calculated percentages with the prescribed ratio. The CPU 71 sets only those divisional images, which has a percentage that the specified hue-region occupies in the subject divisional image greater than the prescribed ratio, as candidates that the user will possibly select as a sample image.

Now assume that the percentages that the specified-hue region occupies in the six divisional images A-F are expressed as RateS_A, RateS_B, RateS_C, RateS_D, RateS_E, and RateS_F, respectively, and that the values RateS_A, RateS_B, RateS_C, RateS_D, and RateS_E are greater than the prescribed ratio but the value RateS_F is smaller than the prescribed ratio. In such a case, the scale mark 630F is omitted from the screen of FIG. 25A or 26A. Only the scale marks 630A-630E are displayed on the screen. Similarly, the scale mark 640F is omitted from the screen of FIG. 25B or 26B. Only the scale marks 640A-640E are displayed on the screen. The user will manipulate the cursor 620 to select one of the divisional images A-E as a sample image.

Figure 28:
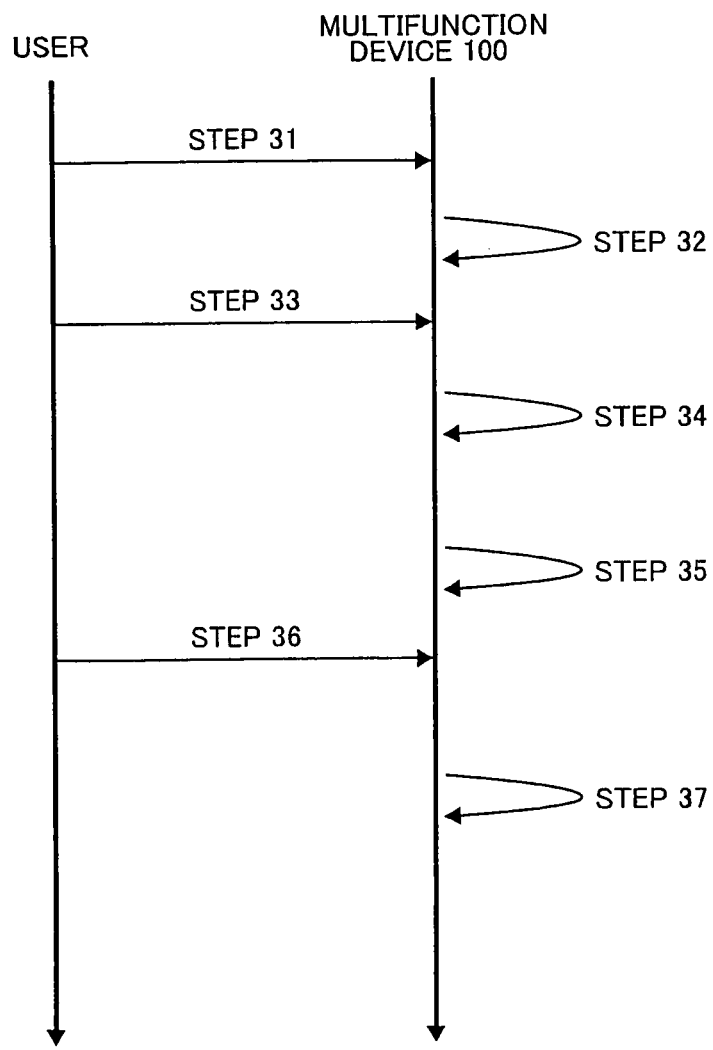
FIG. 28 is an explanatory diagram showing an overview of user operations and resulting processing on a multifunction device in a color conversion process according to a third embodiment.
Figure 29:
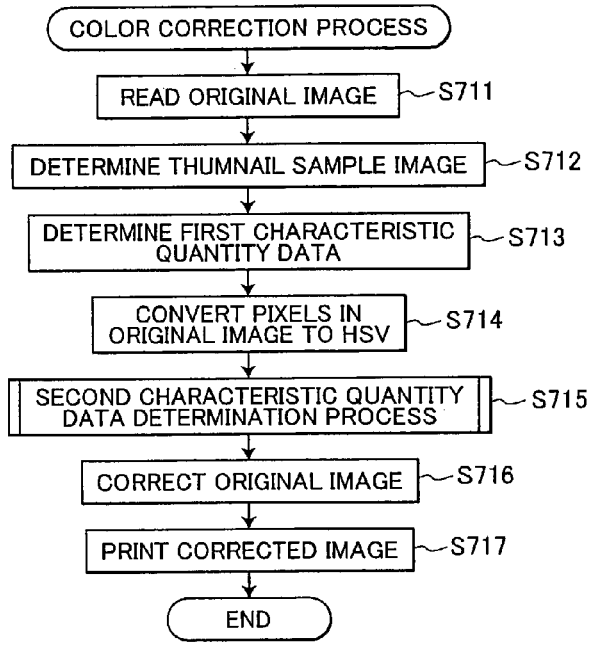
FIG. 29 is a flowchart illustrating steps in the color conversion process according to the third embodiment.

Next, an image multifunction device 100 according to a third embodiment will be described. The multifunction device 100 according to the third embodiment differs from the multifunction device 1 according to the first embodiment described above in that a color correction process illustrated by the flowchart in FIGS. 28 and 29 is performed in place of the color correction process described above with reference to FIGS. 3 and 4. The remaining configuration of the multifunction device 100 is identical to the multifunction device 1 in the first embodiment and will not be described here.

Next, the color correction process performed on the multifunction device 100, including an overview of user operations and the resulting processes performed by the multifunction device 100, will be described. FIG. 28 shows an overview of this process. As shown in FIG. 28, the user first inserts a memory card in the card slot 50 of the multifunction device 100 (step 31).

After the user has inserted a memory card into is the card slot 50, the multifunction device 100 recognizes this memory card and prompts the user to select the original image to be corrected from among the images stored in this memory (step 32).

After the user has specified the original image (step 33), the multifunction device 100 reads the original image from memory and writes the original image data to RAM 73, for example (step 34).

Next, the multifunction device 100 reads thumbnail images of sample images (which will be referred to as "thumbnail sample images" hereinafter) from internal memory (RAM 73) and displays the thumbnail sample images on the display section 32 (step 35). If a plurality of thumbnail sample images are stored in the internal memory, the multifunction device 100 may sequentially display the thumbnail sample images on the display section 32 one at a time or display a prescribed number of images at one time. The process for displaying the thumbnail sample images will be described later in greater detail.

The user selects a desired thumbnail sample image from the images displayed on the display section 32 using the control panel 30 or the touch panel (step 36).

Next, the multifunction device 100 performs an image correction process on the original image based on characteristic quantity data corresponding to the selected thumbnail sample image (step 37). The color correction process will be described later in greater detail.

While the user selects a thumbnail sample image after the original image has been read from the memory card in the process of FIG. 28 described above, the multifunction device 100 may be configured to read the original image from the memory card after the user first specifies a thumbnail sample image. Furthers after the multifunction device 100 performs the color correction process, the image printing unit 40 may print the corrected original image.

Next, the color correction process performed on the multifunction device 100 will be described with reference to FIG. 29. FIG. 29 is a flowchart illustrating steps in the color correction process according to the third embodiment.

In S711 of the color correction process, the CPU 71 reads the original image into the RAM 73 in the same manner as the process of S101 in FIG. 4 (in the first embodiment) In S712 the CPU 71 displays thumbnail sample images on the display section 32, prompts the user to select a desired thumbnail sample image, and determines the thumbnail sample image as a model for correction.

In S713 the CPU 71 determines first characteristic quantity data that is associated with the thumbnail sample image selected in S712.

In S714 the CPU 71 converts each pixel of the original image into a set of HSV parameters in the same manner as the process of S103 in FIG. 4 (in the first embodiment).

In S715 the CPU 71 performs the second characteristic quantity data determination process for determining the second characteristic quantity data of the original image based on the HSV parameters. This process is the same as the second characteristic quantity data determination process of S104 in FIG. 4 (in the first embodiment).

In S716 the CPU 71 corrects the original image based on the first characteristic quantity data determined is in S713 and the second characteristic quantity data determined in S715. This process is same as the process of S121 in FIG. 4 (in the first embodiment).

In S717 the CPU 71 prints the corrected original image corrected in S716. This process is the same as the process of S122 in FIG. 4 (in the first embodiment).

Figure 30:
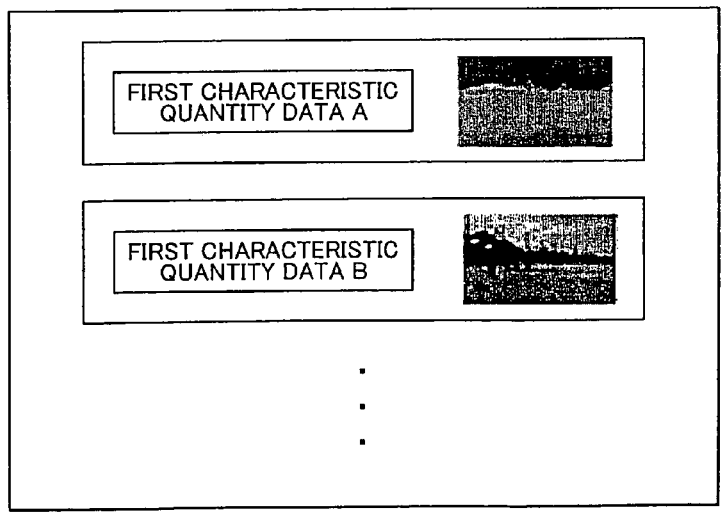
FIG. 30 is an explanatory diagram showing sample data stored in the internal memory.

Here, the thumbnail sample image determined in S712 and the first characteristic quantity data determined in S713 will be described FIG. 30 shows sample data stored in the internal memory (RAM 73, for example). As shown in FIG. 30, a plurality of sets of first characteristic quantity data (first characteristic quantity data A, first characteristic quantity data B, . . . ) and a plurality of thumbnail sample images are stored in pairs in the RAM 73. The plurality of pairs of the first characteristic quantity data and the thumbnail sample image are in one to one correspondence with a plurality of sample images. Each pair of the first characteristic quantity data and the thumbnail sample image has been determined in advance from a corresponding sample image. The first characteristic quantity data has been determined based on the corresponding sample image in the same manner as in S112 of FIG. 4 (first embodiment). The thumbnail sample image has been converted from corresponding the sample image by reducing the sample image to an image of a restricted size. Since the RAM 73 stores only the thumbnail sample images rather than the sample images, it is possible to reduce the required storage capacity of the RAM 73. Further, the thumbnail sample images may be produced by reducing the resolution of the sample images.

The sample images used as the source of the first characteristic quantity data and the thumbnail sample images may also be images read by the image-reading unit 20, for example.

According to the multifunction device 100 of the third embodiment, the multifunction device 100 presents thumbnail sample images representing various sets of first characteristic quantity data and prompts the user to select a thumbnail sample image. The multifunction device 100 then performs image correction on an original image using the first characteristic quantity data corresponding to the selected thumbnail sample image. In this way, the user can select an image to be used as a model for image processing through a simple operation. Further, less storage capacity is required when using reduced images (thumbnail images) as the thumbnail sample images. Further, the multifunction device 100 eliminates the need to repeatedly scan the same sample image when performing image correction a plurality of times using the same characteristic quantity data.

Figure 31:
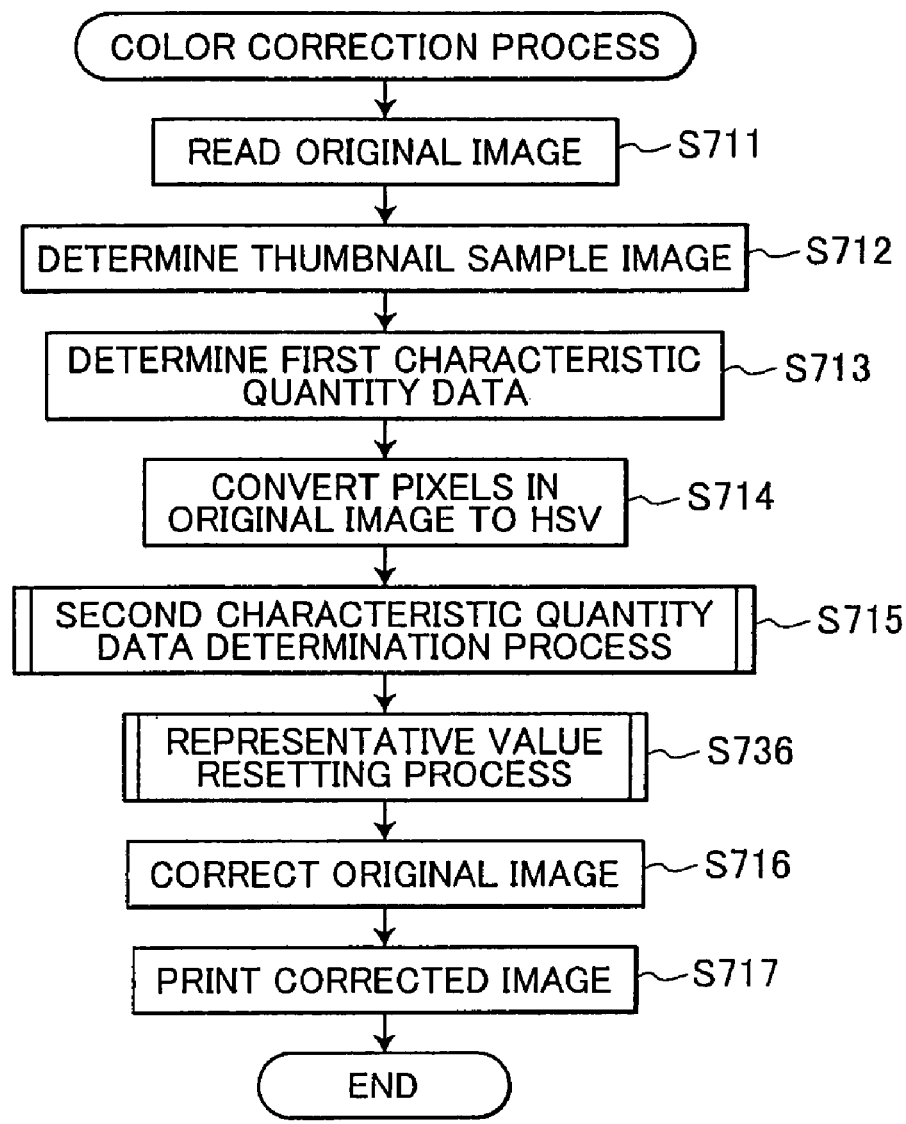
FIG. 31 is a flowchart illustrating steps in a color conversion process according to a first modification of the third embodiment.

FIG. 31 is a flowchart illustrating steps in a color correction process according to a first modification of the third embodiment. The process shown in FIG. 31 is basically the same as that in FIG. 29 described in the third embodiment, except that a representative value resetting process (S736) is added after the second characteristic quantity data determination process (S715). The representative value resetting process of S736 is same as the process shown in FIG. 12 (in the second and third modifications of the first embodiment).

By storing a plurality of types of thumbnail sample images and first characteristic quantity data as shown in FIG. 31, it is possible to increase the number of options for image correction. However, while the user is presented with numerous display images as choices, if the desired thumbnail sample image is not presented quickly, selecting the desired thumbnail sample image may take a considerable amount of time.

Figure 32:
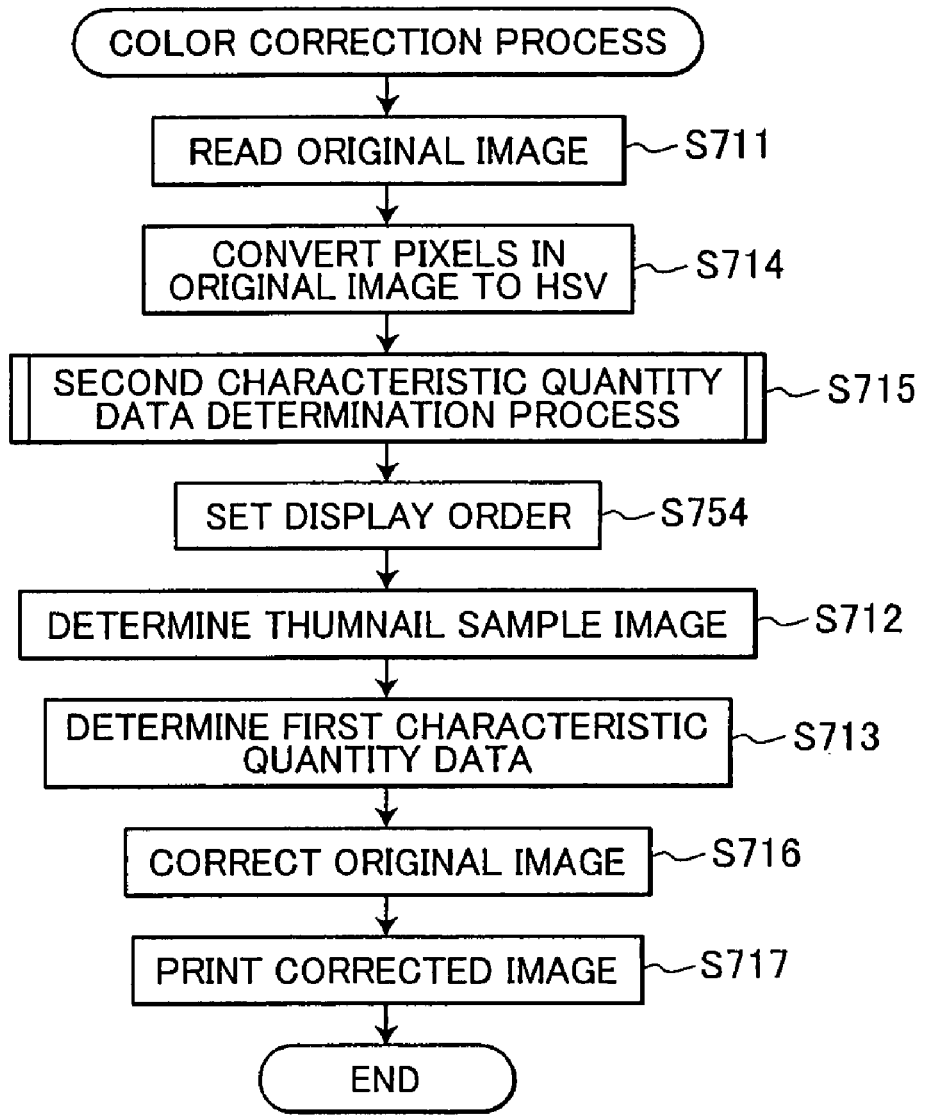
FIG. 32 is a flowchart illustrating steps in a color conversion process according to a second modification of the third embodiment.

Next, a second modification of the third embodiment will be described reference to FIG. 32. The image correction process according to this modification can present stored thumbnail sample images efficiently. FIG. 32 is a flowchart illustrating steps in the color correction process of the second modification of third embodiment. The process of FIG. 32 is different from that of FIG. 29 in the order of the steps S711-S717 and in that the process of FIG. 32 includes a step S754. The step for determining the display order in S754 is the same as the lay out determining process of S116 in FIG. 4 (in the first embodiment), except that the thumbnail sample images are displayed on the display screen 32 in S754 rather than being stored in the index buffer. Specifically, by using the methods (A)-(D) described in the first embodiment, the CPU 71 determines in S754 the order, in which sample images should be arranged, and determines the order, in which thumbnail images of the sample image should be arranged in the display screen 32.

While the invention has been described in detail with reference to the embodiments thereof, it would be apparent to those skilled in the art that various changes and modifications may be made therein without departing from the spirit of the invention.

What is claimed is:

1. An image processing device comprising:
an original image inputting unit that is configured so as to be capable of inputting an original image;
an original-image characteristic quantity data determining unit that determines original-image characteristic quantity data expressing a characteristic of the original image inputted by the original image inputting unit;
a sample-image inputting unit that is configured so as to be capable of inputting a plurality of sample images;
a sample-image characteristic quantity data determining unit that determines a plurality of sets of sample-image characteristic quantity data expressing a characteristic of the plurality of sample images inputted by the sample-image inputting unit;
an outputting unit that outputs at least one set of sample-image data and at least one set among the plurality of sets of sample-image characteristic quantity data;
a selecting unit that enables a user to select one set of sample-image data among the at least one set of sample-image data; and
a correcting unit that corrects the original image based on one set of sample-image characteristic quantity data corresponding to the selected set of sample-image data and the original-image characteristic quantity data.

2. The image processing device according to claim 1, further comprising a printing unit that prints the original image corrected by the correcting unit.

3. The image processing device according to claim 1, further comprising a result image creating unit that creates, as the at least one set of sample-image data, a plurality of result images by using the plurality of sets of sample-image characteristic quantity data, each result image indicating a result of correction on the original image by using the corresponding set of sample-image characteristic quantity data, and
wherein the outputting unit outputs an index showing a list of the plurality of result images, each result image being positioned, in the index, together with an image corresponding to a corresponding sample image that is used for creating the subject result image.

4. The image processing device according to claim 3, wherein the outputting unit prints the index.

5. The image processing device according to claim 3, wherein the result image creating unit comprises:
a display image creating unit that creates a display image based on the original image; and
a creating unit that creates the plurality of result images by correcting the display image based on the plurality of sets of sample-image characteristic quantity data.

6. The image processing device according to claim 5, wherein the display image creating unit creates the display image by reducing the original image to a preset size.

7. The image processing device according to claim 3, wherein the result image creating unit creates a plurality of result images, by correcting the original image based on the plurality of sets of sample-image characteristic quantity data,
wherein the selecting unit enables the user to select one set of the sample-image characteristic quantity data from the plurality of sets of the sample-image characteristic quantity data, and
wherein the image processing device further comprises a printing unit that prints one of the result images that corresponds to the selected set of sample-image characteristic quantity data.

8. The image processing device according to claim 7, further comprising a positioning unit that positions the plurality of result images in the index, based on the plurality of sets of sample-image characteristic quantity data, together with a plurality of corresponding sample images that are used for creating the result images.

9. The image processing device according to claim 1, wherein the sample-image inputting unit inputs at least one image optically read from a document placed in a prescribed reading position, and inputs a plurality of images independently from one another as a plurality of sample images when the plurality of images are read from the document; and wherein the sample-image characteristic quantity data determining unit determines a plurality of sets of sample-image characteristic quantity data based on the plurality of sample images.

10. The image processing device according to claim 1, wherein the sample-image inputting unit inputs a plurality of images read in a plurality of scanning regions divided within a prescribed reading position as the plurality of sample images; and wherein the sample-image characteristic quantity data determining unit determines the plurality of sets of sample-image characteristic quantity data based on the plurality of sample images.

11. The image processing device according to claim 10, wherein the sample-image inputting unit inputs the sample-image optically read from a document placed in a prescribed reading position, and inputs a plurality of images in a plurality of scanning regions divided within the prescribed reading position independently from one another as a plurality of sample images when the plurality of images are read from the document;

wherein the sample-image characteristic quantity data determining unit determines the plurality of sets of sample-image characteristic quantity data based on the plurality of sample images; and wherein the image processing device further comprises a positioning unit that positions the plurality of result images in the index, together with a plurality of images corresponding to the plurality of sample images that are used for creating the subject result images, based on the scanning regions on which the sample images are read.

12. The image processing device according to claim 11, wherein the sample-image inputting unit further comprises a judging unit that judges whether the document is set in each scanning position by judging whether a mean brightness of an image scanned in each scanning region is greater than or equal to a predetermined value.

13. An image processing device comprising:

an original image inputting unit that is configured so as to be capable of inputting an original image;

an original-image characteristic quality data determining unit that determines original-image characteristic quantity data expressing a characteristic of the original image inputted by the original image inputting unit;

an outputting unit that outputs at least one indication concerning at least one set among a plurality of sets of sample-image characteristic quantity data;

a selecting unit that enables a user to select one indication among the at least one indication;

a correcting unit that corrects the original image based on one set of sample-image characteristic quantity data corresponding to the selected indication and the original-image characteristic quantity data;

an overall image inputting unit that inputs an overall image;

a first dividing unit that allocates a plurality of pixels constituting the overall image into a plurality of hue-regions;

a specified hue-region determining unit that determines a specified hue-region to be a hue-region occupying the largest percentage of the overall image among the hue-regions constituting the overall image;

a dividing unit that divides the overall image into a plurality of sample images; and a specified non hue-related sample-image characteristic quantity data determining unit that determines, for the specified hue-region, a plurality of sets of non hue-related sample-image characteristic quantity data indicative of non hue-related characteristic of the plurality of sample images based on pixels whose hues belong to the specified hue-region and which are located in the respective sample images;

wherein the output unit displays a plurality of indications indicating the plurality of sets of non hue-related sample-image characteristic quantity data corresponding to the plurality of sample images, wherein the selecting unit enables the user to select one indication indicative of one set of non-hue related sample-image characteristic quantity data thereby selecting one first image corresponding to the selected indication, wherein the original-image characteristic quantity data determining unit determines the original-image characteristic quantity data for the specified hue-region, the original-image characteristic quantity data including hue-related original-image characteristic data and non hue-related original-image characteristic data, wherein the image processing device further comprises a hue-related sample-image characteristic quantity data determining unit that determines hue-related sample-image characteristic data of the selected first image for the specified hue-region, and wherein the correcting unit corrects the original image, for the specified hue-region, based on the selected hue-related sample-image characteristic quantity data and the determined hue-related sample-image characteristic quantity data and the original-image characteristic quantity data to change, for the specified hue-region, the characteristic of the original image closer to a characteristic corresponding to the selected sample-image characteristic quantity data.

14. The image processing device according to claim 13, wherein the specified hue-region determining unit fails to display an indication indicating the sample-image characteristic quantity data corresponding to a sample image having a percentage that the specified hue-region occupies in the subject sample image less than or equal to a prescribed ratio.

15. The image processing device according to claim 13, further comprising a correction data creating unit that creates correction data based on the selected non-hue related sample-image characteristic quantity data and the determined hue-related sample-image characteristic quantity data the original-image characteristic quantity data, and wherein the image correcting unit corrects the original image based on the correction data.

16. The image processing device according to claim 15, wherein the correcting unit corrects, based on the correction data, values of each pixel of the original image, whose the hue-related data belongs to the specified hue-region.

17. The image processing device according to claim 16, wherein the hue-related sample-image characteristic quantity data is calculated based on H values of the pixels in the sample image defined in the HSV color space.

18. The image processing device according to claim 16, wherein the non-hue related sample-image characteristic quantity data includes characteristic quantity data for brightness and/or saturation.

19. The image processing device according to claim 1, wherein the outputting unit displays a plurality of thumbnail images corresponding to the plurality of sets of sample-image characteristic quantity data;

wherein the selecting unit enables the user to select one thumbnail image from the plurality of thumbnail images, and that selects one set of sample-image characteristic quantity data corresponding to the selected thumbnail image; and wherein the correcting unit corrects the original image based on the selected sample-image characteristic quantity data and original-image characteristic quantity data.

20. The image processing device according to claim 19, further comprising a correction data creating unit that creates correction data based on the selected sample-image characteristic quantity data and the original-image characteristic quantity data, and wherein the image correcting unit corrects the original image based on the correction data.

21. The image processing device according to claim 19, further comprising:

a second dividing unit that divides a plurality of pixels constituting the original image into a plurality of hue-regions;

a ratio-calculating unit that calculates a ratio of the original image occupied by the pixels belonging to each hue-region, and a specified hue-region determining unit that determines a specified hue-region to be a hue-region occupying the largest percentage of the original image;

wherein the original-image characteristic quantity data determining unit determines original-image characteristic quantity data indicative of characteristic of the original image in the specified hue-region, and wherein the outputting unit displays, as the at least one set of sample-image data, first thumbnail images in such an order that gives priority to one of the thumbnail images whose sample-image characteristic quantity data for the specified hue-region is similar to the original-image characteristic quantity data for the specified hue-region.

22. The image processing device according to claim 19, further comprising:

a second dividing unit that divides a plurality of pixels constituting the original image into a plurality of hue-regions;

a ratio-calculating unit that calculates a ratio of the original image occupied by the pixels belonging to each hue-region;

a specified hue-region determining unit that determines a specified hue-region to be a hue-region occupying the largest percentage of the original image;

an allocating unit that allocates, into either one of a plurality of groups, each of the plurality of sets of sample-image characteristic quantity data based on the hue-region occupying the largest percentage of a sample image corresponding to the subject sample-image characteristic quantity data, the groups including a specified group whose constituent corresponds to such a first image whose hue-region occupying the largest percentage thereof is equal to the specified hue-region, and wherein the outputting unit displays, as the at least one set of image data, at least one of the plurality of thumbnail images that corresponds to at least one set of first characteristic quantity data allocated to the specified group.

23. The image processing device according to claim 22, wherein the original-image characteristic quantity data determining unit determines specified original-image characteristic quantity data indicative of characteristic to the original image in the specified hue-region, and wherein the outputting unit displays the at least one thumbnail image in such order that gives priority to one of the at least one thumbnail image whose sample-image characteristic quantity data for the specified hue-region is similar to the specified original-image characteristic quantity data for the specified hue-region.

24. The image processing device according to claim 19, wherein the outputting unit displays, at least one of the at least two thumbnail images whose sample-image characteristic quantity data is similar to one another, while failing to display at least one other remaining thumbnail image.

25. The image processing device according to claim 24, wherein the outputting unit fails to display at least one of the first thumbnail image in an order of generation of the sample-image characteristic quantity data.

26. The image processing device according to claim 25, wherein the sample-image characteristic quantity data includes hue-related sample-image characteristic data and non hue-related sample-image characteristic data, wherein the image processing device further comprises:

a second dividing unit that divides a plurality of pixels constituting the original image into a plurality of hue-regions based on data of the original image;

a second hue data determining unit that determines second hue-related data for each hue-region of the original image based on data of the original image; and a second non-hue data determining unit that determines second non-hue-related data for each hue-region of the original image, wherein the correction data creating unit creates hue correction data based on the first hue-related data and second hue-related data, wherein the image correcting unit creates a set of non-hue correction data, and wherein the correcting unit corrects hue-related data in each pixel of the original image based on the hue correction data, corrects the non-hue-related data in each pixel of the original image based on the non-hue-related correction data.

27. The image processing device according to claim 26, wherein the first hue-related data is calculated based on H values of the pixels in the sample image defined in the HSV color space, and wherein the second hue-related data is calculated based on H values of the pixels in the original image defined in the HSV color space.

28. The image processing device according to claim 19, further comprising:

a storage unit that stores the plurality of sets of sample-image characteristic quantity data and the plurality of thumbnail images corresponding to a plurality of sample images, the plurality of first characteristic quantity data indicating characteristic of the plurality of first images; and a sample-image characteristic quantity data determining unit that reads the plurality of sets of sample-image characteristic quantity data from the storage unit.

29. An image processing method comprising:

inputting an original image;

determining original-image characteristic quantity data expressing a characteristic of the original image;

inputting a plurality of sample images;

determining a plurality of sets of sample-image characteristic quantity data expressing a characteristic of the plurality of sample images inputted by the sample-image inputting unit;

outputting at least one set of sample image data and at least one set among the plurality of sets of sample-image characteristic quantity data;

enabling a user to select one set of image data among the at least one set of image data; and correcting the original image based on one set of sample-image characteristic quantity data corresponding to the selected set of image data and the original-image characteristic quantity data.

30. A non-transitory computer-readable recording medium that stores an image data processing program, the data processing program comprising instructions for:

inputting an original image;

determining original-image characteristic quantity data expressing a characteristic of the original image;

inputting a plurality of sample images;

determining a plurality of sets of sample-image characteristic quantity data expressing a characteristic of the plurality of sample images inputted by the sample-image inputting unit;

outputting at least one set of sample image data and at least one set among the plurality of sets of sample-image characteristic quantity data;

enabling a user to select one set of image data among the at least one set of image data; and correcting the original image based on one set of sample-image characteristic quantity data corresponding to the selected set of image data and the original-image characteristic quantity data.

31. The image processing device according to claim 13, wherein the overall image inputting unit inputs the overall image optically read from a document placed on a prescribed reading position, and wherein the original image inputting unit inputs the original image stored in a storage medium.

32. An image processing method comprising:

inputting an original image;

determining original-image characteristic quantity data expressing a characteristic of the original image;

outputting at least one indication concerning at least one set among a plurality of sets of sample-image characteristic quantity data;

enabling a user to select one indication among the at least one indication;

correcting the original image based on one set of sample-image characteristic quantity data corresponding to the selected indication and the original-image characteristic quantity data;

inputting an overall image;

allocating a plurality of pixels constituting the overall image into a plurality of hue-regions;

determining a specified hue-region to be a hue-region occupying the largest percentage of the overall image among the hue-regions constituting the overall image;

dividing the overall image into a plurality of sample images; and determining, for the specified hue-region, a plurality of sets of non hue-related sample-image characteristic quantity data indicative of non hue-related characteristic of the plurality of sample images based on pixels whose hues belong to the specified hue-region and which are located in the respective sample images;

wherein the output unit displays a plurality of indications indicating the plurality of sets of non hue-related sample-image characteristic quantity data corresponding to the plurality of sample images, wherein the selecting unit enables the user to select one indication indicative of one set of non-hue related sample-image characteristic quantity data thereby selecting one first image corresponding to the selected indication, wherein the original-image characteristic quantity data determining unit determines the original-image characteristic quantity data for the specified hue-region, the original-image characteristic quantity data including hue-related original-image characteristic data and non hue-related original-image characteristic data, wherein the image processing device further comprises a hue-related sample-image characteristic quantity data determining unit that determines hue-related sample-image characteristic data of the selected first image for the specified hue-region, and wherein the correcting unit corrects the original image, for the specified hue-region, based on the selected hue-related sample-image characteristic quantity data and the determined hue-related sample-image characteristic quantity data and the original-image characteristic quantity data to change, for the specified hue-region, the characteristic of the original image closer to a characteristic corresponding to the selected sample-image characteristic quantity data.

33. A non-transitory computer-readable recording medium that stores an image data processing program, the data processing program comprising instructions for:

inputting an original image;

determining original-image characteristic quantity data expressing a characteristic of the original image;

outputting at least one indication concerning at least one set among a plurality of sets of sample-image characteristic quantity data;

enabling a user to select one indication among the at least one indication;

correcting the original image based on one set of sample-image characteristic quantity data corresponding to the selected indication and the original-image characteristic quantity data;

inputting an overall image;

allocating a plurality of pixels constituting the overall image into a plurality of hue-regions;

determining a specified hue-region to be a hue-region occupying the largest percentage of the overall image among the hue-regions constituting the overall image;

dividing the overall image into a plurality of sample images; and determining, for the specified hue-region, a plurality of sets of non hue-related sample-image characteristic quantity data indicative of non hue-related characteristic of the plurality of sample images based on pixels whose hues belong to the specified hue-region and which are located in the respective sample images;

wherein the output unit displays a plurality of indications indicating the plurality of sets of non hue-related sample-image characteristic quantity data corresponding to the plurality of sample images, wherein the selecting unit enables the user to select one indication indicative of one set of non-hue related sample-image characteristic quantity data thereby selecting one first image corresponding to the selected indication, wherein the original-image characteristic quantity data determining unit determines the original-image characteristic quantity data for the specified hue-region, the original-image characteristic quantity data including hue-related original-image characteristic data and non hue-related original-image characteristic data, wherein the image processing device further comprises a hue-related sample-image characteristic quantity data determining unit that determines hue-related sample-image characteristic data of the selected first image for the specified hue-region, and wherein the correcting unit corrects the original image, for the specified hue-region, based on the selected hue-related sample-image characteristic quantity data and the determined hue-related sample-image characteristic quantity data and the original-image characteristic quantity data to change, for the specified hue-region, the characteristic of the original image closer to a characteristic corresponding to the selected sample-image characteristic quantity data.

* * * * *